(12) United States Patent
Sundararajan et al.

(10) Patent No.: US 11,425,746 B2
(45) Date of Patent: Aug. 23, 2022

(54) SCHEDULING REQUESTS FOR GRANT-FREE CONFIGURATIONS

(71) Applicant: QUALCOMM Incorporated, San Diego, CA (US)

(72) Inventors: Jay Kumar Sundararajan, San Diego, CA (US); Jing Jiang, San Diego, CA (US); Linhai He, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/408,421

(22) Filed: May 9, 2019

(65) Prior Publication Data

US 2019/0349974 A1     Nov. 14, 2019

Related U.S. Application Data

(60) Provisional application No. 62/670,654, filed on May 11, 2018.

(51) Int. Cl.
    *H04W 72/12*      (2009.01)
    *H04W 72/14*      (2009.01)
    *H04W 88/06*      (2009.01)

(52) U.S. Cl.
    CPC ......... *H04W 72/1284* (2013.01); *H04W 72/1268* (2013.01); *H04W 72/14* (2013.01); *H04W 88/06* (2013.01)

(58) Field of Classification Search
    CPC ......... H04W 72/1284; H04W 72/1268; H04W 72/14; H04W 88/06

(Continued)

(56) References Cited

U.S. PATENT DOCUMENTS

| 2012/0140743 A1* | 6/2012 | Pelletier | H04W 76/15 |
| | | | 370/335 |
| 2012/0182977 A1* | 7/2012 | Hooli | H04W 72/1278 |
| | | | 370/336 |

(Continued)

OTHER PUBLICATIONS

Intel Corporation: "Uplink URLLC Transmission Based on Scheduling Request and Grant," 3GPP Draft; R1-1700376 Intel-UL SR URLLC, 3rd Generation Partnership Project (3GPP), Mobile Competence Centre; 650, Route Des Lucioles; F-06921, Sophia-Antipolis Cedex; France, vol. RAN WG1, No. Spokane, USA, Jan. 16, 2017-Jan. 20, 2017, Jan. 16, 2017, XP051207913, 8 pages, Retrieved from the Internet: URL: http://www.3gpp.org/ftp/Meetings_3GPP_SYNC/RAN1/Docs/[retrieved on Jan. 16, 2017], Section 5.1.

(Continued)

*Primary Examiner* — Kwang B Yao
*Assistant Examiner* — Xuan Lu
(74) *Attorney, Agent, or Firm* — Holland & Hart LLP

(57) ABSTRACT

Generally, the described techniques provide for a user equipment (UE) generating a scheduling request (SR) for a set of data for an uplink transmission from the UE to a base station. The UE may determine whether the SR for the set of data is associated with a grant-free configuration for the UE. The grant-free configuration may indicate a set of time-frequency resources that the UE may use to transmit the set of data. The UE may transmit to the base station an indication of whether the SR is associated with the grant-free configuration. If the SR is associated with a grant-free configuration for the UE, the UE may use the corresponding resources to transmit the set of data to the base station, and the base station may then decode the data based on having received the indication of the resources by way of the grant-free configuration.

25 Claims, 19 Drawing Sheets

(58) Field of Classification Search
USPC .......................................................... 370/330
See application file for complete search history.

(56) References Cited

U.S. PATENT DOCUMENTS

| | | | | |
|---|---|---|---|---|
| 2016/0295631 | A1* | 10/2016 | Gubeskys | H04W 76/15 |
| 2017/0013610 | A1* | 1/2017 | Lee | H04L 1/1861 |
| 2017/0290031 | A1* | 10/2017 | Hwang | H04W 72/14 |
| 2017/0290047 | A1 | 10/2017 | Islam et al. | |
| 2018/0124824 | A1* | 5/2018 | Lee | H04W 48/16 |
| 2018/0184413 | A1* | 6/2018 | Rong | H04W 76/11 |
| 2018/0288746 | A1* | 10/2018 | Zhang | H04L 1/0031 |
| 2018/0376493 | A1* | 12/2018 | Li | H04W 72/085 |
| 2019/0166620 | A1* | 5/2019 | Yasukawa | H04W 88/02 |
| 2019/0320446 | A1* | 10/2019 | Li | H04W 72/1252 |
| 2019/0393988 | A1* | 12/2019 | Bae | H04L 1/1671 |
| 2021/0136827 | A1* | 5/2021 | Xiong | H04L 5/0044 |

OTHER PUBLICATIONS

International Search Report and Written Opinion—PCT/US2019/031849—ISA/EPO—dated Jul. 3, 2019.
Lenovo et al., "On UL Transmission Procedures to Reduce Latency and Enhance Reliability", 3GPP Draft; R1-1719749_UL TX Procedure_Final, 3rd Generation Partnership Project (3GPP), Mobile Competence Centre ; 650, Route Des Lucioles ; F-06921 Sophia-Antipolis Cedex; France, vol. RAN WG1, Nov. 19, 2017 (Nov. 19, 2017), XP051370418, 5 Pages, Retrieved from the Internet: URL:http://www.3gpp.org/ftp/tsg%5Fran/WG1%5FRL1/TSGR1%5F91/Docs/ [retrieved on Nov. 19, 2017], section 2.
Nokia et al., "Simultaneous Configuration of Grant and Grant-Free Based UL Transmission for URLLC UEs", 3GPP Draft; R1-1802550_GF_GB_FINAL, 3rd Generation Partnership Project (3GPP), Mobile Competence Centre ; 650, Route Des Lucioles ; F-06921 Sophia-Antipolis Cedex ; France, vol. RAN WG1, No. Athens, Greece; Feb. 26, 2018-Mar. 2, 2018, Feb. 17, 2018 (Feb. 17, 2018), XP051398012, 3 Pages, Retrieved from the Internet: URL:http://www.3gpp.org/ftp/tsg%5Fran/WG1%5FRL1/TSGR1%5F92/Docs/ [retrieved on Feb. 17, 2018], sections 1, 2.1 and 2.2.
Qualcomm Incorporated: "Simultaneous UL SR Channel", 3GPP Draft; R1-1711200 Simultaneous UL SR Channel, 3rd Generation Partnership Project (3GPP), Mobile Competence Centre ;650, Route Des Lucioles ; F-06921 Sophia-Antipolis Cedex ; France, vol. RAN WG1, No. Qingdao; Jun. 27, 2017-Jun. 30, 2017, Jun. 17, 2017 (Jun. 17, 2017), XP051305480, 10 Pages, Retrieved from the Internet: URL:http://www.3gpp.org/ftp/tsg_ran/WG1_RL1/TSGR1_AH/NR_AH_1706/Docs/ [retrieved on—Jun. 17, 2017], section 2.2.

* cited by examiner

SCHEDULING REQUESTS FOR GRANT-FREE CONFIGURATIONS

CROSS REFERENCE

The present Application for Patent claims benefit of U.S. Provisional Patent Application No. 62/670,654 by SUNDARARAJAN et al., entitled "Scheduling Requests For Grant-Free Configurations," filed May 11, 2018, assigned to the assignee hereof, and expressly incorporated by reference herein.

BACKGROUND

The following relates generally to wireless communications, and more specifically to scheduling requests (SRs) for grant-free configurations.

Wireless communications systems are widely deployed to provide various types of communications content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code-division multiple access (CDMA), time-division multiple access (TDMA), frequency-division multiple access (FDMA), orthogonal frequency-division multiple access (OFDMA), or discrete Fourier transform-spread-orthogonal frequency-division multiplexing (DFT-s-OFDM). A wireless multiple-access communications system may include a number of base stations or network access nodes, each simultaneously supporting communication for multiple communications devices, which may be otherwise known as user equipment (UE).

A wireless communications system may utilize a grant-based transmission scheme where, for example, a UE requests time-frequency resources for performing an uplink transmission. A UE may request such resources by transmitting an SR to a base station. Some wireless communications systems may support a grant-free transmission scheme in which time-frequency resources are allocated to one or more UEs, and UEs may utilize these resources for uplink transmission without transmitting an SR. Communications systems that support grant-free transmission schemes and SRs may result in miscommunications, excessive communications, or other issues.

SUMMARY

The described techniques relate to improved methods, systems, devices, and apparatuses that support scheduling requests (SRs) for grant-free configurations in wireless communications systems. Generally, the described techniques provide for a user equipment (UE) utilizing an SR for transmission of a set of data, which may be associated with a grant-free configuration. The grant-free configuration may indicate a set of grant-free time-frequency resources that the UE may use to transmit data without receiving a grant. In some cases, the UE may transmit to the base station an indication of whether the SR is associated with the grant-free configuration. For example, if the SR is associated with a grant-free configuration, the UE may use the corresponding resources to transmit the set of data to the base station, and the base station may then decode the data. The base station may also associate the SR transmitted by the UE with the decoded set of data and either disregard the SR if the data has already been decoded, or monitor the grant-free configuration indicated by the SR to receive and decode the data. Alternatively, if the SR is associated with a grant-free configuration, the base station may transmit an uplink grant to the UE indicating a set of resources for the UE to use for transmission of the data.

A method of wireless communications is described. The method may include generating an SR for a set of data for an uplink transmission from a UE to a base station and determining whether the SR for the set of data is associated with a grant-free configuration for the UE. The method may include transmitting, to the base station, an indication of whether the SR is associated with the grant-free configuration based on the determination.

An apparatus for wireless communications is described. The apparatus may include a processor, memory in electronic communication with the processor, and instructions stored in the memory. The instructions may be executable by the processor to cause the apparatus to generate an SR for a set of data for an uplink transmission from a UE to a base station and determine whether the SR for the set of data is associated with a grant-free configuration for the UE. The instructions may be executable by the processor to cause the apparatus to transmit, to the base station, an indication of whether the SR is associated with the grant-free configuration based on the determination.

Another apparatus for wireless communications is described. The apparatus may include means for generating an SR for a set of data for an uplink transmission from a UE to a base station and means for determining whether the SR for the set of data is associated with a grant-free configuration for the UE. The apparatus may include means for transmitting, to the base station, an indication of whether the SR is associated with the grant-free configuration based on the determination.

A non-transitory computer-readable medium storing code for wireless communications is described. The code may include instructions executable by a processor to generate an SR for a set of data for an uplink transmission from a UE to a base station and determine whether the SR for the set of data is associated with a grant-free configuration for the UE. The code may include instructions executable by the processor to transmit, to the base station, an indication of whether the SR is associated with the grant-free configuration based on the determination.

In some examples of the method, apparatuses, and non-transitory computer-readable medium described herein, transmitting the indication may include operations, features, means, or instructions for transmitting the SR to the base station, where the SR indicates whether the SR may be associated with the grant-free configuration.

In some examples of the method, apparatuses, and non-transitory computer-readable medium described herein, transmitting the SR may include operations, features, means, or instructions for identifying a spreading sequence that indicates information associated with the grant-free configuration and transmitting the SR according to the spreading sequence. Some examples of the method, apparatuses, and non-transitory computer-readable medium described herein may further include operations, features, means, or instructions for identifying a codeword that indicates information associated with the grant-free configuration and transmitting the SR, where the SR includes the codeword. Some examples of the method, apparatuses, and non-transitory computer-readable medium described herein may further include operations, features, means, or instructions for identifying a cyclic redundancy check (CRC) mask corresponding to information associated with the grant-free configuration and transmitting the SR based on the CRC mask.

In some examples of the method, apparatuses, and non-transitory computer-readable medium described herein, the SR indicates that the SR may be associated with the grant-free configuration and the SR indicates a indicates a radio access technology (RAT), a carrier, an index of the grant-free configuration, or a combination thereof. In some examples of the method, apparatuses, and non-transitory computer-readable medium described herein, the SR indicates that the SR may be not associated with the grant-free configuration.

Some examples of the method, apparatuses, and non-transitory computer-readable medium described herein may further include operations, features, means, or instructions for transmitting the SR to the base station, where the SR may be not associated with the grant-free configuration for the UE, receiving, from the base station, a grant that indicates a set of time-frequency resources for the uplink transmission and transmitting the uplink transmission to the base station via the set of time-frequency resources.

Some examples of the method, apparatuses, and non-transitory computer-readable medium described herein may further include operations, features, means, or instructions for transmitting the SR to the base station, where the SR may be associated with the grant-free configuration for the UE, identifying a set of time-frequency resources based on the grant-free configuration, and transmitting the uplink transmission to the base station via the set of time-frequency resources.

In some examples of the method, apparatuses, and non-transitory computer-readable medium described herein, the uplink transmission and the SR may be transmitted on different carriers. In some examples of the method, apparatuses, and non-transitory computer-readable medium described herein, the uplink transmission and the SR may be transmitted using different RATs.

A method of wireless communications is described. The method may include identifying, by a base station, a set of grant-free configurations for a UE, and receiving, from the UE, an SR associated with an uplink transmission from the UE to the base station, where the SR indicates whether the SR is associated with a grant-free configuration of the set of grant-free configurations. The method may include transmitting a downlink transmission to the UE based on the SR, where the downlink transmission includes a feedback message, an uplink grant, or a combination thereof.

An apparatus for wireless communications is described. The apparatus may include a processor, memory in electronic communication with the processor, and instructions stored in the memory. The instructions may be executable by the processor to cause the apparatus to identify, by a base station, a set of grant-free configurations for a UE, and receive, from the UE, an SR associated with an uplink transmission from the UE to the base station, where the SR indicates whether the SR is associated with a grant-free configuration of the set of grant-free configurations. The instructions may be executable by the processor to cause the apparatus to transmit a downlink transmission to the UE based on the SR, where the downlink transmission includes a feedback message, an uplink grant, or a combination thereof.

Another apparatus for wireless communications is described. The apparatus may include means for identifying, by a base station, a set of grant-free configurations for a UE and means for receiving, from the UE, an SR associated with an uplink transmission from the UE to the base station, where the SR indicates whether the SR is associated with a grant-free configuration of the set of grant-free configurations. The apparatus may include means for transmitting a downlink transmission to the UE based on the SR, where the downlink transmission includes a feedback message, an uplink grant, or a combination thereof.

A non-transitory computer-readable medium storing code for wireless communications is described. The code may include instructions executable by a processor to identify, by a base station, a set of grant-free configurations for a UE, and receive, from the UE, an SR associated with an uplink transmission from the UE to the base station, where the SR indicates whether the SR is associated with a grant-free configuration of the set of grant-free configurations. The code may include instructions executable by the processor to transmit a downlink transmission to the UE based on the SR, where the downlink transmission includes a feedback message, an uplink grant, or a combination thereof.

Some examples of the method, apparatuses, and non-transitory computer-readable medium described herein may further include operations, features, means, or instructions for determining that the SR may be associated with the grant-free configuration and decoding a transmission from the UE transmitted over a set of time-frequency resources associated with the grant-free configuration.

Some examples of the method, apparatuses, and non-transitory computer-readable medium described herein may further include operations, features, means, or instructions for identifying a spreading sequence associated with the SR, where the spreading sequence indicates information associated with the grant-free configuration. Some examples of the method, apparatuses, and non-transitory computer-readable medium described herein may further include operations, features, means, or instructions for identifying a codeword of the SR, where the codeword indicates information associated with the grant-free configuration. Some examples of the method, apparatuses, and non-transitory computer-readable medium described herein may further include operations, features, means, or instructions for determining a CRC mask of the SR, where the CRC mask corresponds to information associated with the grant-free configuration.

In some examples of the method, apparatuses, and non-transitory computer-readable medium described herein, the SR indicates a RAT, a carrier, an index of the grant-free configuration, or a combination thereof.

Some examples of the method, apparatuses, and non-transitory computer-readable medium described herein may further include operations, features, means, or instructions for transmitting, to the UE, a Radio Resource Control (RRC) message or a medium access control (MAC) control element (CE) that indicates information to convey via the SR.

Some examples of the method, apparatuses, and non-transitory computer-readable medium described herein may further include operations, features, means, or instructions for determining that the SR may be not associated with the grant-free configuration and transmitting the feedback message or the uplink grant based on determining that the SR may be not associated with the grant-free configuration.

Some examples of the method, apparatuses, and non-transitory computer-readable medium described herein may further include operations, features, means, or instructions for receiving the uplink transmission from the UE based on the SR. In some examples of the method, apparatuses, and non-transitory computer-readable medium described herein, the uplink transmission and the SR may be received on different carriers. In some examples of the method, apparatuses, and non-transitory computer-readable medium described herein, the uplink transmission and the SR may be received using different RATs.

DETAILED DESCRIPTION

Figure 1:
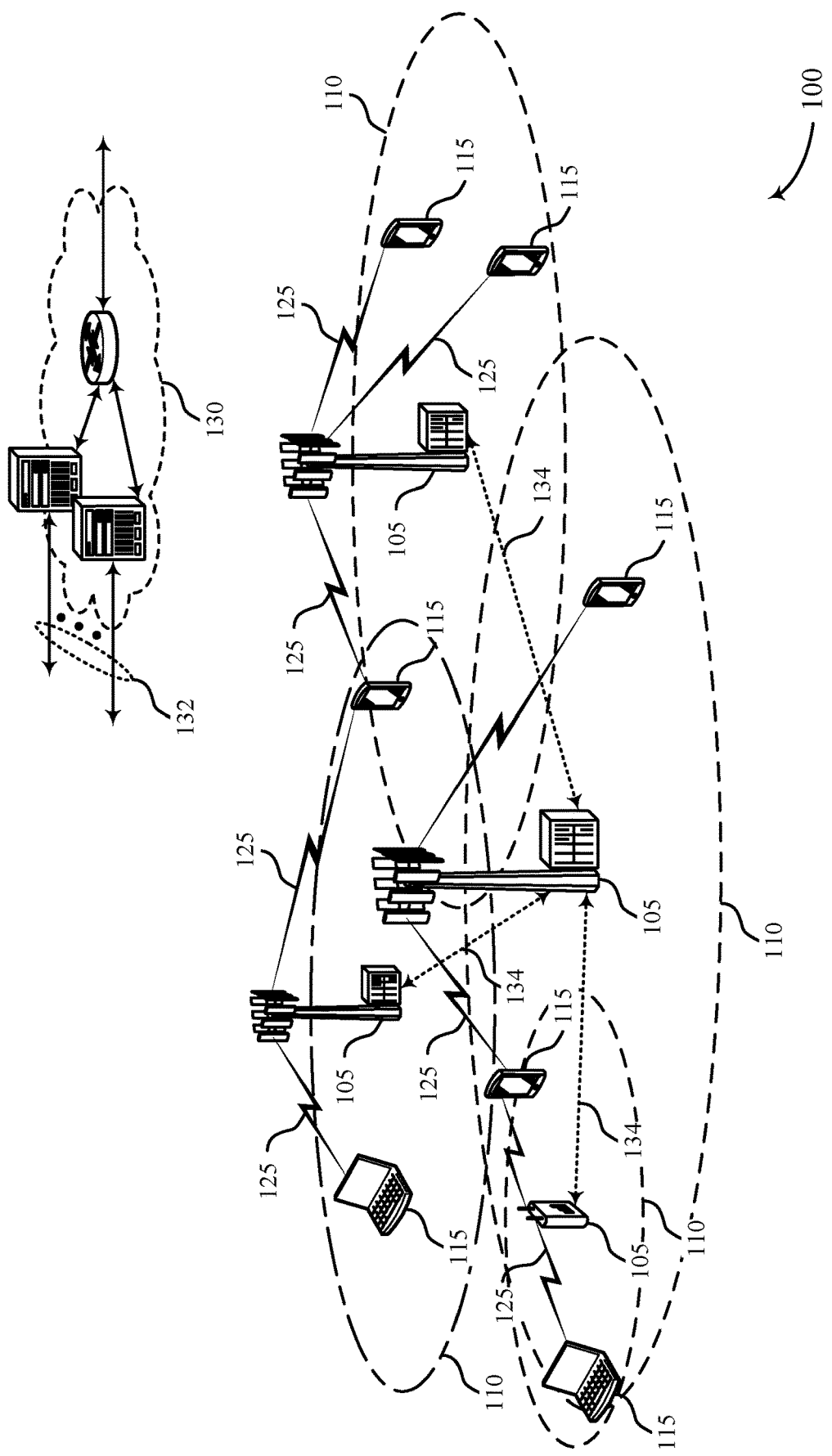
FIG. 1 illustrates an example of a wireless communications system in accordance with aspects of the present disclosure.

Some wireless communications systems may utilize a grant-based transmission scheme to indicate time-frequency resources on which a user equipment (UE) or a base station may transmit data. In grant-based uplink operation, a UE that has data to transmit may transmit a scheduling request (SR) to a base station, and the base station may reply to the UE with an uplink grant indicating resources on which to transmit the data. The UE may then use the assigned resources to transmit the data. This grant-based uplink operation, however, incurs a delay from the time at which data becomes available at the UE to transmit and the time at which the UE transmits the data on the assigned resources.

To help reduce latency and signaling overhead associated with exchanging the SR and the grant, a grant-free mode of uplink operation may be used. In the grant-free mode of uplink operation, the UE may be configured with one or more patterns of resources for a set of channels on which the UE may transmit data without having first received an uplink grant. In some cases, however, the network may not detect the data transmission from the UE on these resources, in which case the data may not be decoded and because there may be no mechanism for the UE to indicate that a transmission has occurred, the base station may not send feedback to indicate a decoding failure. Further, in some cases, the pattern of resources to be used for grant-free transmissions may be preconfigured, in which case the resources may not be optimized for the current channel and interference conditions.

One technique for mitigating some of the drawbacks associated with grant-based uplink operation and with grant-free uplink operation is for the UE to transmit an SR in conjunction with (e.g., before, simultaneously with, or after) a grant-free data transmission. According to this technique, when the data transmission is received and decoded (e.g., by a base station), the SR may be ignored and therefore does not cause a delay in transmission as a result of exchanging the transmission. When the transmission is not detected and decoded (e.g., because of a collision on a contention-based channel, or for other reasons), the base station may use the SR as a trigger to decode the grant-free transmission. Additionally or alternatively, for example, if decoding fails, the base station may use the SR to provide a transmission grant (or transmit feedback) indicating resources for retransmission of the data transmission. Thus, the latency of the transmission may be decreased under some scenarios.

In some cases, the UE may be configured with a set of more than one grant-free uplink configurations (e.g., grant-free uplink configurations corresponding to different grant-free resources on one or more channels). The UE may select one or more configurations from the set of grant-free uplink configurations with which to transmit. According to this described technique, however, the base station may be unaware of whether to associate the SR with a grant-free uplink configuration, and if so, which grant-free uplink configuration (e.g., which grant-free resources to decode). Without this knowledge, the base station may blindly decode all possible configured resources, which may increase complexity.

According to aspects of the present disclosure, the UE may signal information to the base station to identify which particular grant-free uplink resources to decode and whether a given SR is associated with a grant-free configuration. For example, the UE may embed information within an SR that the base station may use to identify whether the SR is associated with a grant-free uplink configuration, and if the SR is associated with a grant-free uplink configuration, the particular grant-free uplink configurations of a set of grant-free uplink configurations with which to associate the SR. In some cases, the base station may not provide an uplink grant in response to the SR if the base station detects and decodes the associated grant-free transmission successfully. When the base station receives the SR according to these techniques, the base station may identify one or more grant-free uplink configurations with which the SR is associated, and accordingly may determine which particular resources to decode.

The described technique may be used across different carriers and radio access technologies (RATs). For example, the UE may transmit the grant-free data transmission on a first carrier or using a first RAT and transmit the SR on a second carrier or using a second RAT (e.g., a carrier or RAT that uses a lower radio frequency spectrum band as compared to the carrier or RAT used for the data transmission). Transmitting the SR on a lower radio frequency spectrum band with relatively improved coverage and signal quality may provide for increased reliability and thus a higher probability that the SR is detected.

Aspects of the disclosure are initially described in the context of a wireless communications system. Further examples illustrate a process flow for signaling indication as to whether an SR is associated with a grant-free uplink configuration, and if so, a particular grant-free uplink configuration with which the SR is associated. Aspects of the disclosure are further illustrated by and described with reference to apparatus diagrams, system diagrams, and flowcharts that relate to scheduling requests for grant-free configurations.

FIG. 1 illustrates an example of a wireless communications system 100 in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency-division duplexing (FDD), time-division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples, a receiving device may use a single receive beam to receive along a single beam direction (e.g., when receiving a data signal). The single receive beam may be aligned in a beam direction determined based on listening according to different receive beam directions (e.g., a beam direction determined to have a highest signal strength, highest signal-to-noise ratio, or otherwise acceptable signal quality based on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may, in some cases, perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI).

In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an Evolved Universal Terrestrial Radio Access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency-division multiplexing (OFDM) or discrete Fourier transform-spread-OFDM (DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time-division multiplexing (TDM) techniques, frequency-division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples, the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or resource blocks (RBs)) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In some examples, UE 115 transmits an SR in parallel with a grant-free data transmission. These transmissions may, but in some cases may not be, simultaneous. According to this technique, when the data transmission is received and decoded (e.g., by a base station 105), the SR may be ignored and therefore does not result in delay due to the SR. When the transmission is not detected and decoded (e.g., because of a collision on a contention-based channel, or for other reasons), the base station 105 may use the SR as a trigger to decode the grant-free transmission. Additionally or alternatively, for example, if decoding fails, the base station 105 may use the SR to provide a transmission grant indicating resources for retransmission of the data transmission. Thus, the latency of the transmission may be decreased under some scenarios.

According to aspects of the present disclosure, the UE 115 may signal this information to the base station 105 to identify which particular grant-free uplink resources to decode. For example, the UE 115 may include in the SR an indication as to whether the SR is associated with a grant-free uplink configuration, and if so, which particular grant-free uplink configuration the SR is associated. In some cases, the base station 105 may determine not to provide an uplink grant in response to the SR if the base station 105 detects and decodes the associated grant-free transmission successfully. The described technique may be used across different carriers and RATs. For example, the UE 115 may transmit the grant-free data transmission on a first carrier or using a first RAT and transmit the SR on a second carrier or using a second RAT (e.g., a carrier or RAT that uses a lower radio frequency spectrum band as compared to the carrier or RAT used for the data transmission). Transmitting the SR on a lower radio frequency spectrum band with relatively improved coverage and signal quality may provide for increased reliability and thus a higher probability that the SR is detected.

Figure 2:
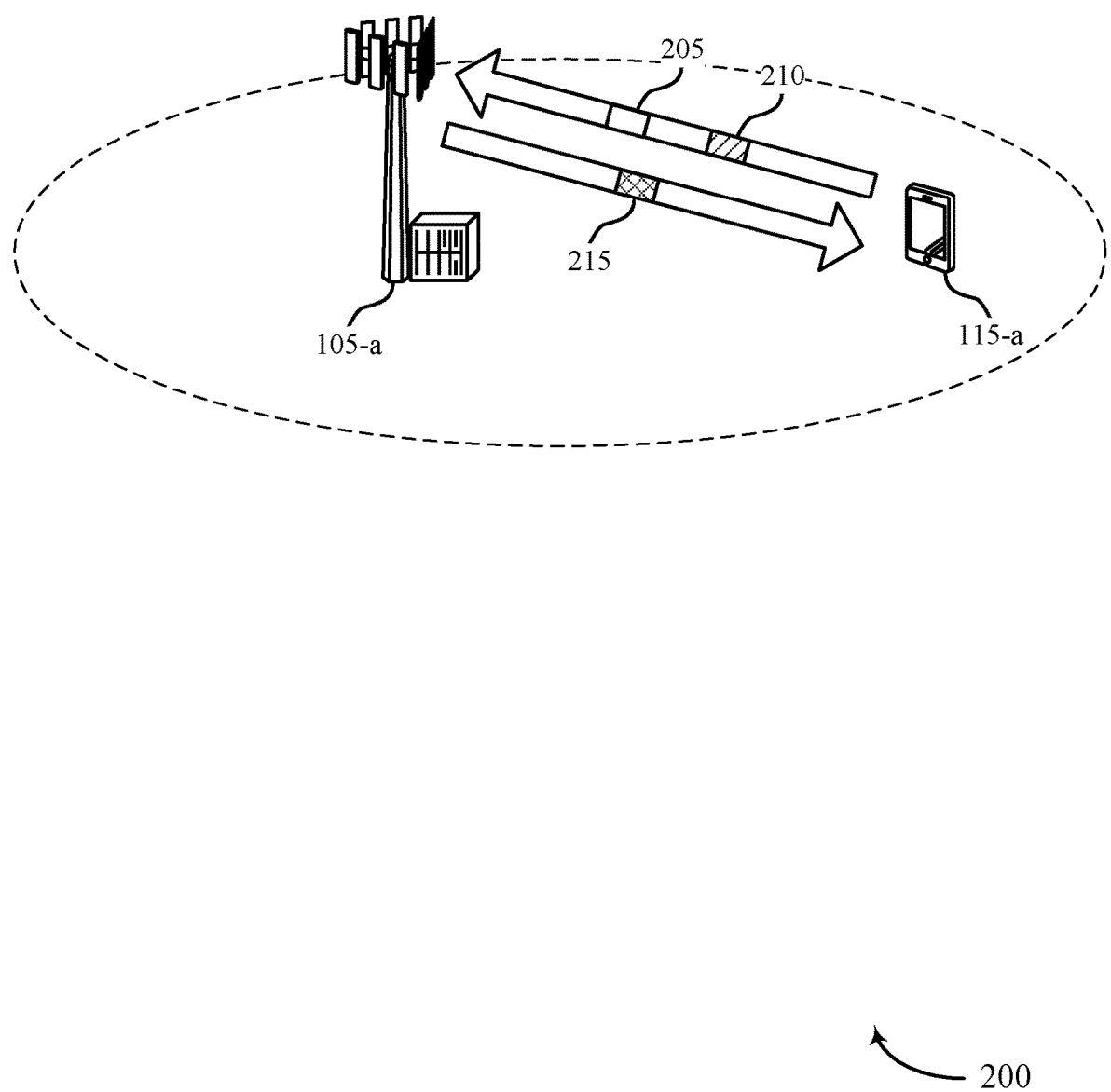
FIG. 2 illustrates an example of a wireless communications system in accordance with aspects of the present disclosure.

FIG. 2 illustrates an example of a wireless communications system 200 in accordance with aspects of the present disclosure. The wireless communications system 200 includes a base station 105-a and a UE 115-a, which may be examples of the corresponding devices as described with reference to FIG. 1. The wireless communications system 200 may be an example of a system that supports mmW communications. The wireless communications system 200 may utilize signaling techniques for transmitting and receiving SRs 205 to indicate grant-free configurations for transmitted and received uplink transmissions 210 between the UE 115-a and the base station 105-a. In the below examples, a particular operation may be described with reference to a UE 115 or a base station 105, but it should be understood that the operation may also be performed by either a UE 115 or a base station 105. Similarly, the grant-free configurations may be described with reference to grant-free uplink configuration, but it should be understood that analogous operations may be applied for the downlink.

In some examples, the UE 115-a may be configured with one or more grant-free configurations (e.g., one or more configured grants). A grant-free configuration or a configured grant may be semi-statically configured via RRC signaling, or other signaling techniques, from a base station 105-a, rather than being configured dynamically via control signaling (e.g., using a dynamically signaled grant in a physical downlink control channel (PDCCH)). A grant-free configuration may indicate a set of time-frequency resources of a channel (e.g., a pattern of time-frequency resources, a periodic set of frequency resources, and aperiodic set of frequency resources) configured for the UE 115-a to use for autonomous uplink transmissions, as described in more detail below. Thus, the UE 115-a may use the set of resources indicated by the grant-free configuration to transmit an uplink message (an uplink data transmission, control information, etc.) to one or more devices (e.g., base station 105-a) in the wireless communications system 200. The UE 115-a may transmit this uplink message without receiving an additional, explicit uplink grant (e.g., from base station 105-a) for the set of time-frequency resources. That is, the UE 115-a may transmit the uplink message over these resources without having to schedule the uplink message (e.g., through transmission of an SR to base station 105-a). In this manner, the UE 115-a may autonomously communicate (with one or more devices of the wireless communications system 200) using resources of the grant-free configuration. The UE 115-a, however, may still receive grants for other sets of resources (e.g., time-frequency resources that do not overlap with the resources indicated by the grant-free configuration).

In the wireless communications system 200, the UE 115-a may embed information within an SR 205 that the base station 105-a may use to identify whether the SR 205 is associated with a grant-free uplink configuration, and if the SR 205 is associated with a grant-free uplink configuration, the particular grant-free uplink configuration of a set of grant-free uplink configurations with which to associate the SR 205. That is, the UE 115-a may either convey with the SR 205 that the SR 205 is not associated with any grant-free uplink configuration, or that the SR 205 is associated with a grant-free uplink configuration and the RAT, carrier, and grant-free uplink configuration indices with which the SR is associated. The grant-free uplink configuration may identify grant-free resources on which the UE 115-a may transmit the uplink transmission 210, and thus the resources for the base station 105-a to decode.

The grant-free uplink configuration information may be signaled using a variety of techniques. For example, the UE 115-a may transmit the SR 205 using one of a set of different spreading sequences, where each spreading sequence of the set corresponds to a respective grant-free uplink configuration. Additionally or alternatively, the UE 115-a may transmit the information using a codeword indicating the grant-free uplink configuration (e.g., using a simplex code or a Reed Muller code). Additionally or alternatively, the UE 115-a may transmit the SR 205 using one of a set of CRC masks, where each CRC mask of the set corresponds to a respective grant-free uplink configuration. That is, according to each of these techniques, the UE 115-a may determine a grant-free uplink configuration and then apply the respective spreading sequence, codeword, or CRC mask corresponding to the grant-free uplink configuration.

When the base station 105-a receives the SR 205 according to these techniques, the base station 105-a may identify one or more grant-free uplink configurations with which the SR 205 is associated, and accordingly may determine which particular resources to decode (i.e., the resources on which the UE 115-a transmitted the uplink transmission 210). For example, the base station 105-a may identify that the SR is not associated with a grant-free transmission and may transmit an uplink grant that indicates a set of resources for the UE to use for an uplink transmission. In other examples, the base station 105-*a* may determine that the SR is associated with a grant-free uplink transmission and the SR may indicate the grant-free configuration associated with the grant-free uplink transmission. For instance, the SR may indicate the carrier or a grant-free configuration index associated with the grant-free uplink transmission. This information may indicate the set of time-frequency resources that the base station 105-*a* is to monitor in order to receive the grant-free uplink transmission associated with the SR.

The base station 105-*a* may further determine whether to transmit an uplink grant 215 to the UE 115-*a*. For example, if the base station 105-*a* detects and successfully decodes the uplink transmission 210 with which the SR 205 is associated, the base station 105-*a* may not transmit the uplink grant 215. Alternatively, if the base station 105-*a* does not successfully decode the uplink transmission 210 with which the SR 205 is associated, the base station 105-*a* may transmit the uplink grant 215 to the UE 115-*a*. The uplink grant 215 may indicate a resource allocation that the UE 115-*a* may use for subsequent transmissions or to retransmit the data in the uplink transmission 210 that was not successfully decoded. Additionally or alternatively, if the base station 105-*a* does not successfully decode the uplink transmission 210 with which the SR 205 is associated, the base station 105-*a* may transmit a feedback message (e.g., a negative acknowledgement (NACK)) to the UE 115-*a*, based on which the UE 115-*a* may either retransmit the SR 205 or the uplink transmission 210 (e.g., using different frequency-time resources).

Thus, when the UE 115-*a* is configured with multiple grant-free uplink configurations, according to the described technique, the UE 115-*a* may be able to indicate which particular grant-free uplink configuration of a set of grant-free uplink configurations is used. In particular, this technique may be used across different carriers and RATs. For example, the UE 115-*a* may transmit the grant-free uplink transmission 210 on a first carrier or using a first RAT and transmit the SR 205 on a second carrier or using a second RAT. In some cases, the UE 115-*a* may transmit the SR 205 using a carrier or RAT with a relatively higher reliability, or that may provide a higher probability that the SR 205 is detected by the base station 105-*a* (e.g., a carrier or RAT that uses a lower radio frequency spectrum band as compared to the carrier or RAT used for the uplink transmission 210).

Figure 3:
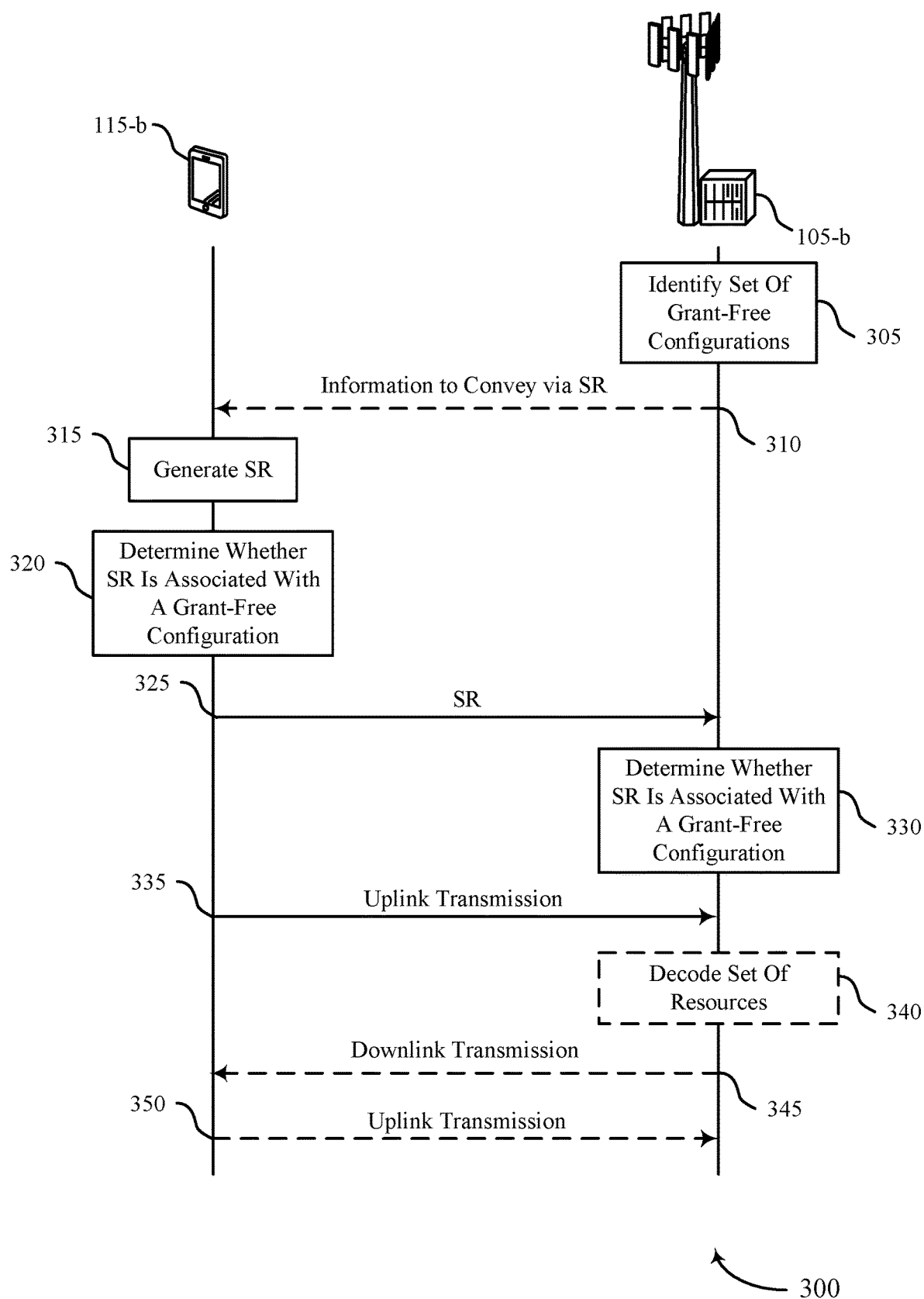
FIG. 3 illustrates an example of a process flow in accordance with aspects of the present disclosure.

FIG. 3 illustrates an example of a process flow 300 in a wireless communications system in accordance with aspects of the present disclosure. The process flow 300 includes a UE 115-*b* and a base station 105-*b*, which may be respective examples of a UE 115 and a base station 105 as described with reference to FIGS. 1 and 2. The process flow 300 may be an example of the UE 115-*b* embedding information within an SR that the base station 105-*b* may use to identify whether the SR is associated with a grant-free uplink configuration, and if the SR is associated with a grant-free uplink configuration, the particular grant-free uplink configuration of a set of grant-free uplink configurations with which to associate the SR. The operations in the process flow 300 performed by UE 115-*b* and base station 105-*b* may be respectively performed by either a UE 115 or a base station 105, and the example shown should not be construed as limiting. In alternative examples, the operations shown as performed by UE 115-*b* may be performed by a base station 105, and the operations shown as performed by base station 105-*b* may be performed by a UE 115. Similarly, the grant-free configurations may be described with reference to grant-free uplink configuration, but it should be understood that analogous operations may be applied for the downlink.

At 305, the base station 105-*b* may identify a set of grant-free configurations (e.g., grant-free uplink configurations). At 310, the base station 105-*b* may transmit to the UE 115-*b*, and the UE 115-*b* may receive from the base station 105-*b*, a message that indicates information that the UE 115-*b* may convey via SR. For example, the base station 105-*b* may transmit the set of identified grant-free configurations to the UE 115-*b*. The information may, for example, be transmitted in an RRC message or a MAC control element (CE) that indicates information to convey via the SR. The signaling at 310 may, in some cases, be optional. For instance, the wireless communications system supporting communications between UE 115-*b* and base station 105-*b* may have previously configured the set of grant-free configurations or the mechanism with which the UE 115-*b* is to embed information within an SR (e.g., spreading sequence, a codeword, CRC mask). In some aspects, the UE 115-*b* may be preconfigured with this information (e.g., based on a set of regulatory standards).

At 315, the UE 115-*b* may generate an SR for a set of data for an uplink transmission from the UE 115-*b* to the base station 105-*b*.

At 320, the UE 115-*b* may determine whether the SR for the set of data, as may have been generated at 315, is associated with a grant-free configuration for the UE 115-*b*. In the case that the SR is for associated with the grant-free configuration for the UE 115-*b*, the UE 115-*b* may identify a set of resources (e.g., time-frequency resources) for the uplink transmission based on the grant-free configuration.

At 325, the UE 115-*b* may transmit to the base station 105-*b*, and the base station 105-*b* may receive from the UE 115-*b*, an indication of whether the SR is associated with the grant-free configuration based on the determination at 320. Transmitting the indication may include transmitting the SR to the base station 105-*b*, as may have been generated at 315, where the SR indicates whether the SR is associated with the grant-free configuration. In some cases, the SR may indicate that the SR is associated with the grant-free configuration, and the SR indicates a RAT, a carrier, an index of the grant-free configuration, or a combination (i.e., a carrier or bearer index for the uplink transmission at 335). Alternatively, the SR may indicate that the SR is not associated with a grant-free configuration.

In some cases, transmitting the SR may include identifying a spreading sequence that indicates information associated with the grant-free configuration and transmitting the SR according to the spreading sequence. Additionally or alternatively, transmitting the SR may include identifying a codeword that indicates information associated with the grant-free configuration and transmitting the SR including the codeword. Additionally or alternatively, transmitting the SR may include identifying a CRC mask corresponding to information associated with the grant-free configuration and transmitting the SR based on the CRC mask.

At 330, the base station 105-*b* may determine whether the SR is associated with a grant-free configuration. If, for example, the SR is associated with a grant-free configuration, the base station 105-*b* may identify the spreading sequence associated with the SR, where the spreading sequence indicates information associated with the grant-free configuration. Additionally or alternatively, the base station 105-*b* may identify the codeword of the SR, where the codeword indicates information associated with the grant-free configuration. Additionally or alternatively, the base station 105-*b* may determine a CRC mask of the SR, where the CRC mask corresponds to information associated with the grant-free configuration.

At 335, the UE 115-*b* may transmit to the base station 105-*b*, and the base station 105-*b* may receive from the UE 115-*b*, the uplink transmission. The UE 115-*b* may transmit the uplink transmission via the set of resources as may have been identified at 320. In some cases, the uplink transmission and the SR, as may have been transmitted at 325, may be transmitted on different carriers or using different RATs.

At 340, the base station 105-*b* may, for example, if the base station 105-*b* determines at 330 that the SR is associated with the grant-free configuration, decode the set of resources. The set of resources may include the uplink transmission, as may have been received at 335.

At 345, the base station 105-*b* may transmit to the UE 115-*b*, and the UE 115-*b* may receive from the base station 105-*b*, a downlink transmission based on the SR, as may have been received at 325. The downlink transmission may include a feedback message, an uplink grant, or a combination. In the case in which the SR is not associated with the grant-free configuration for the UE 115-*b*, the downlink transmission may include a grant (e.g., an uplink grant) that indicates a set of resources (e.g., time-frequency resources) for the uplink transmission.

At 350, the UE 115-*b* may transmit to the base station 105-*b*, and the base station 105-*b* may receive from the UE 115-*b*, an uplink transmission. The uplink transmission at 350 may, for example, be a retransmission of the data that may have been transmitted in the uplink transmission at 335. The UE 115-*b* may transmit the uplink transmission using the set of time-frequency resources as may have been indicated by the base station 105-*b* via the downlink transmission at 345.

Figure 4:
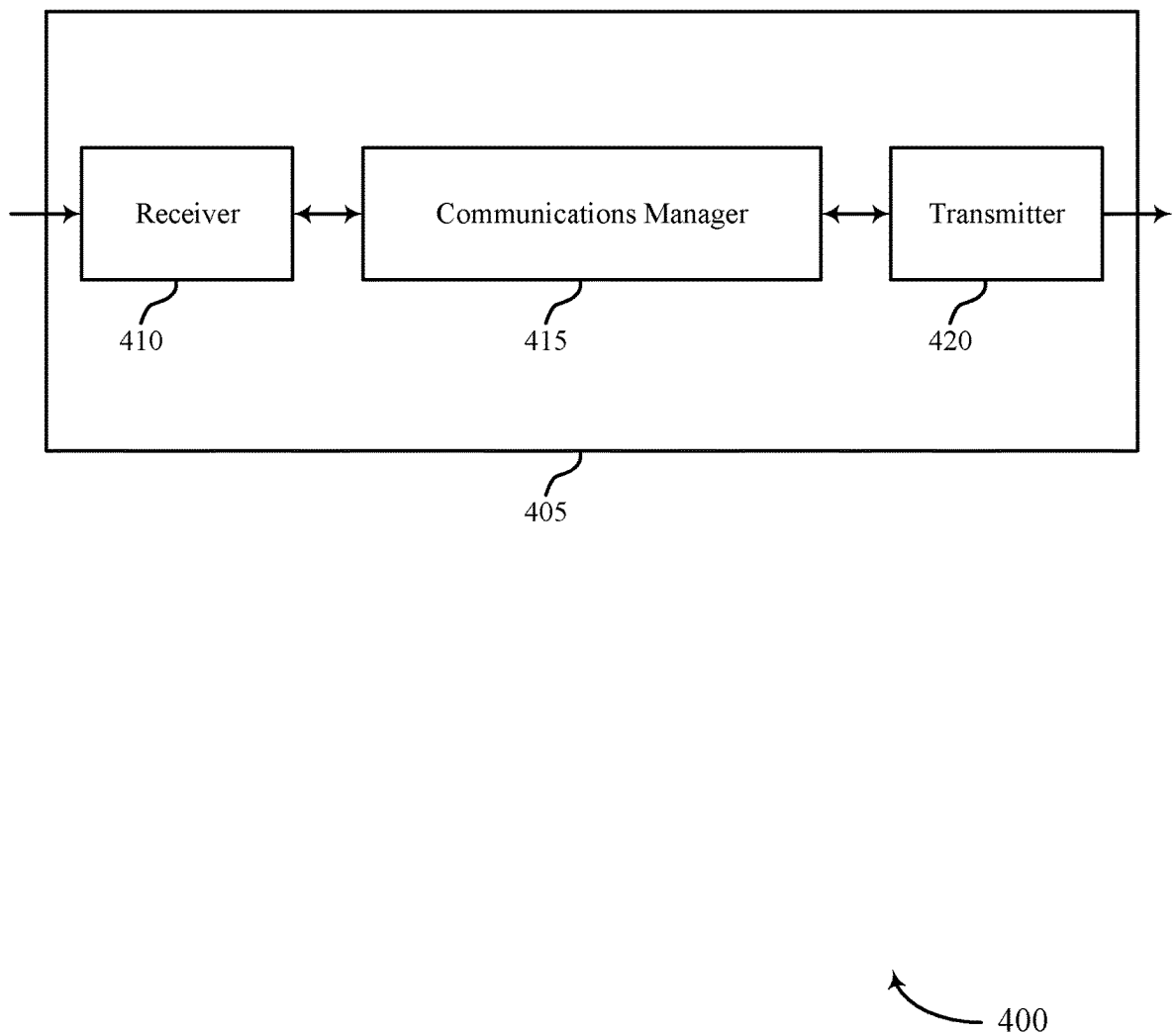
FIGS. 4 and 5 show block diagrams of devices in accordance with aspects of the present disclosure.

FIG. 4 shows a block diagram 400 of a device 405 in accordance with aspects of the present disclosure. The device 405 may be an example of aspects of a UE 115 as described herein. The device 405 may include a receiver 410, a communications manager 415, and a transmitter 420. The device 405 may also include a processor. Each of these components may be in communication with one another (e.g., via one or more buses).

The receiver 410 may receive information such as packets, user data, or control information associated with various information channels (e.g., control channels, data channels, and information related to scheduling requests for grant-free configurations, etc.). Information may be passed on to other components of the device 405. The receiver 410 may be an example of aspects of the transceiver 720 described with reference to FIG. 7. The receiver 410 may utilize a single antenna or a set of antennas.

The communications manager 415 may generate an SR for a set of data for an uplink transmission from a UE to a base station, determine whether the SR for the set of data is associated with a grant-free configuration for the UE, and transmit, to the base station, an indication of whether the SR is associated with the grant-free configuration based on the determination. The communications manager 415 may be an example of aspects of the communications manager 710 described herein.

The communications manager 415, or its sub-components, may be implemented in hardware, code (e.g., software or firmware) executed by a processor, or any combination thereof. If implemented in code executed by a processor, the functions of the communications manager 415, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 415, or its sub-components, may be physically located at various positions, including being distributed such that portions of functions are implemented at different physical locations by one or more physical components. In some examples, the communications manager 415, or its sub-components, may be a separate and distinct component in accordance with various aspects of the present disclosure. In some examples, the communications manager 415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 420 may transmit signals generated by other components of the device 405. In some examples, the transmitter 420 may be collocated with a receiver 410 in a transceiver module. For example, the transmitter 420 may be an example of aspects of the transceiver 720 described with reference to FIG. 7. The transmitter 420 may utilize a single antenna or a set of antennas.

Figure 5:
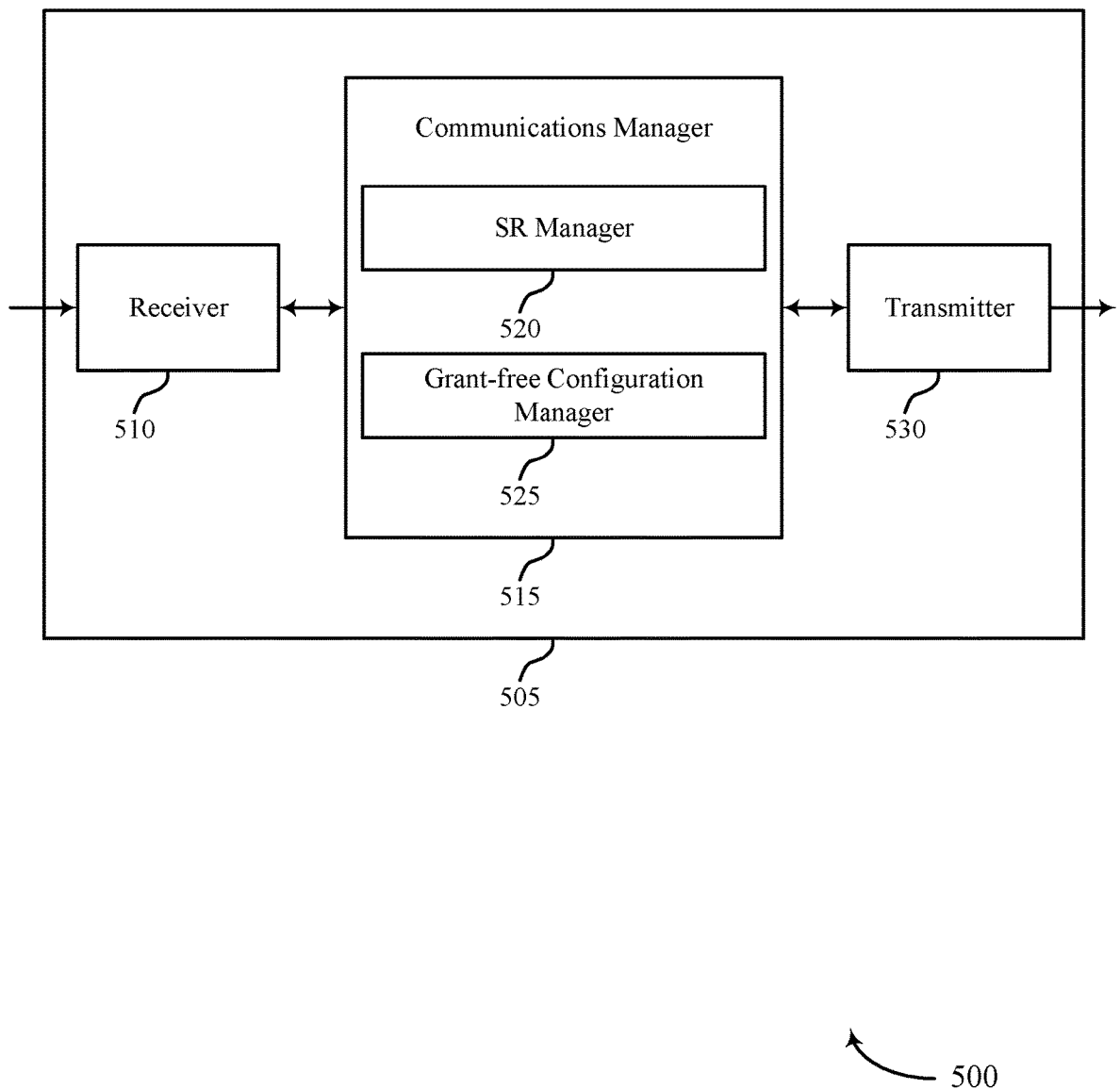

FIG. 5 shows a block diagram 500 of a device 505 in accordance with aspects of the present disclosure. The device 505 may be an example of aspects of a device 405 or a UE 115 as described herein. The device 505 may include a receiver 510, a communications manager 515, and a transmitter 530. The device 505 may also include a processor. Each of these components may be in communication with one another (e.g., via one or more buses).

The receiver 510 may receive information such as packets, user data, or control information associated with various information channels (e.g., control channels, data channels, and information related to scheduling requests for grant-free configurations, etc.). Information may be passed on to other components of the device 505. The receiver 510 may be an example of aspects of the transceiver 720 described with reference to FIG. 7. The receiver 510 may utilize a single antenna or a set of antennas.

The communications manager 515 may be an example of aspects of the communications manager 415 as described herein. The communications manager 515 may include an SR manager 520 and a grant-free configuration manager 525. The communications manager 515 may be an example of aspects of the communications manager 710 described herein.

The SR manager 520 may generate an SR for a set of data for an uplink transmission from a UE 115 to a base station 105.

The grant-free configuration manager 525 may determine whether the SR for the set of data is associated with a grant-free configuration for the UE 115 and transmit, to the base station 105, an indication of whether the SR is associated with the grant-free configuration based on the determination.

The transmitter 530 may transmit signals generated by other components of the device 505. In some examples, the transmitter 530 may be collocated with a receiver 510 in a transceiver module. For example, the transmitter 530 may be an example of aspects of the transceiver 720 described with reference to FIG. 7. The transmitter 530 may utilize a single antenna or a set of antennas.

Figure 6:
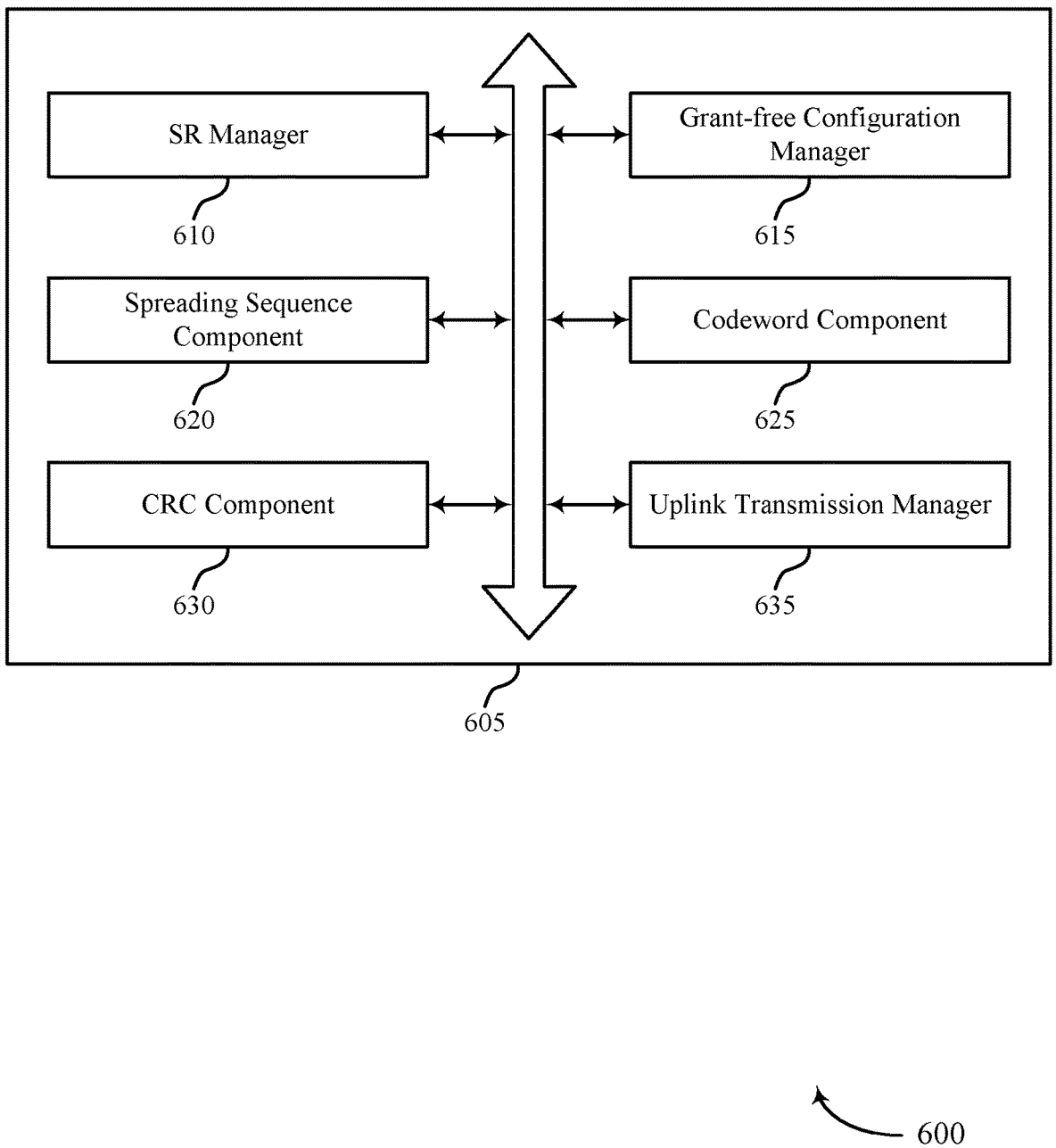
FIG. 6 shows a block diagram of a communications manager in accordance with aspects of the present disclosure.

FIG. 6 shows a block diagram 600 of a communications manager 605 in accordance with aspects of the present disclosure. The communications manager 605 may be an example of aspects of a communications manager 415, a communications manager 515, or a communications manager 710 described herein. The communications manager 605 may include an SR manager 610, a grant-free configuration manager 615, a spreading sequence component 620, a codeword component 625, a CRC component 630, and an uplink transmission manager 635. Each of these modules may communicate, directly or indirectly, with one another (e.g., via one or more buses).

The SR manager 610 may generate an SR for a set of data for an uplink transmission from a UE 115 to a base station 105. In some examples, the SR manager 610 may transmit the SR to the base station 105, where the SR indicates whether the SR is associated with the grant-free configuration. In some examples, the SR manager 610 may transmit the SR according to a spreading sequence. In some examples, transmitting the SR including a codeword. In some examples, the SR manager 610 may transmit the SR based on a CRC mask.

In some examples, the SR manager 610 may transmit the SR to the base station 105, where the SR is not associated with the grant-free configuration for the UE 115. Alternatively, the SR manager 610 may transmit the SR to the base station 105, where the SR is associated with the grant-free configuration for the UE 115. In some cases, the SR indicates that the SR is associated with the grant-free configuration. In some cases, the SR indicates a RAT, a carrier, an index of the grant-free configuration, or a combination. In some cases, the SR indicates that the SR is not associated with the grant-free configuration.

The grant-free configuration manager 615 may determine whether the SR for the set of data is associated with a grant-free configuration for the UE 115. In some examples, the grant-free configuration manager 615 may transmit, to the base station 105, an indication of whether the SR is associated with the grant-free configuration based on the determination.

In some examples, the grant-free configuration manager 615 may identify a set of time-frequency resources based on the grant-free configuration.

The spreading sequence component 620 may identify the spreading sequence that indicates information associated with the grant-free configuration.

The codeword component 625 may identify the codeword that indicates information associated with the grant-free configuration.

The CRC component 630 may identify the CRC mask corresponding to information associated with the grant-free configuration.

The uplink transmission manager 635 may receive, from the base station 105, a grant that indicates a set of time-frequency resources for the uplink transmission. In some examples, the uplink transmission manager 635 may transmit the uplink transmission to the base station via the set of time-frequency resources. In some cases, the uplink transmission and the SR are transmitted on different carriers. In some cases, the uplink transmission and the SR are transmitted using different RATs.

Figure 7:
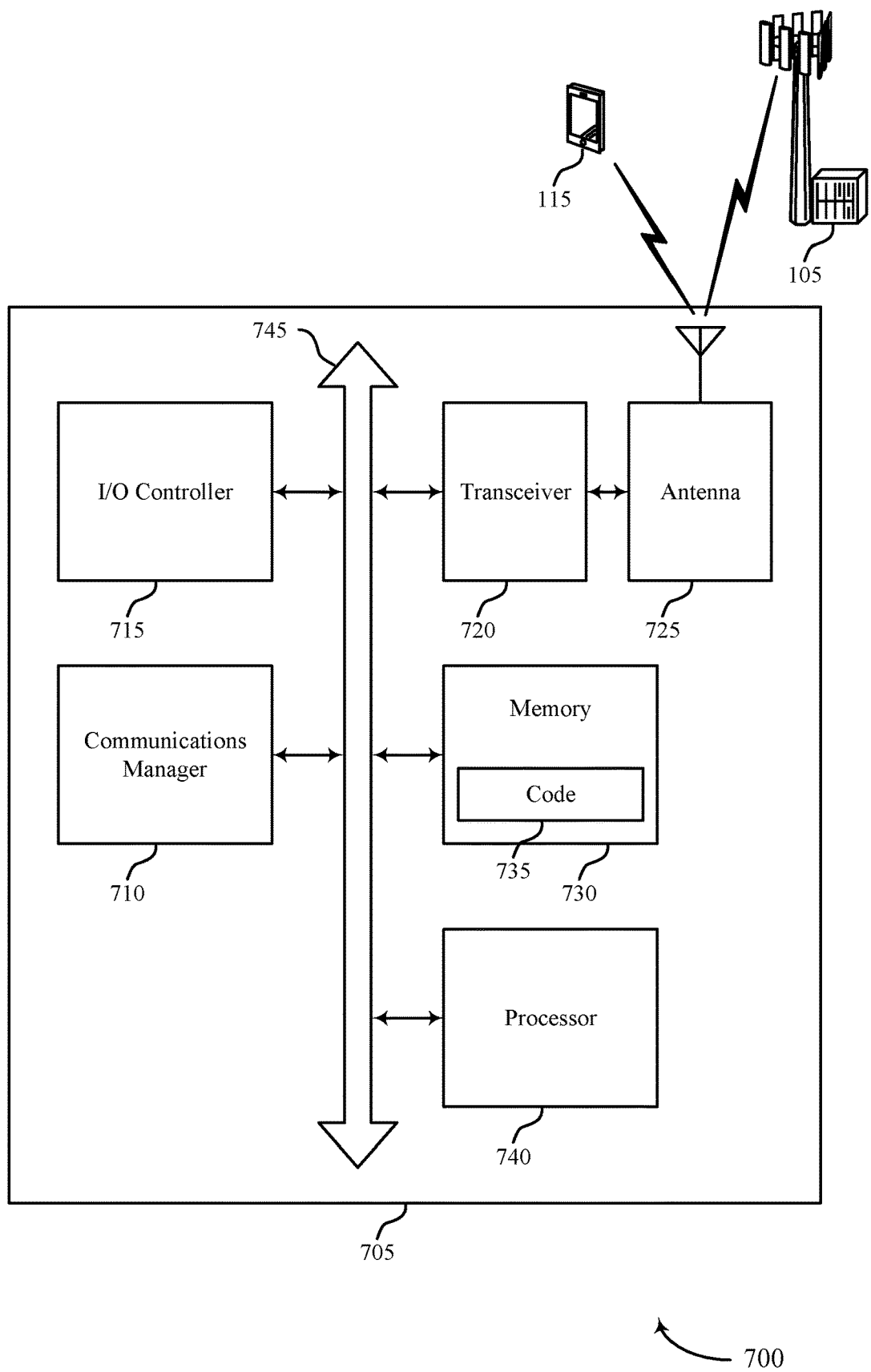
FIG. 7 shows a diagram of a system including a device in accordance with aspects of the present disclosure.

FIG. 7 shows a diagram of a system 700 including a device 705 in accordance with aspects of the present disclosure. The device 705 may be an example of or include the components of device 405, device 505, or a UE 115 as described herein. The device 705 may include components for bi-directional voice and data communications including components for transmitting and receiving communications, including a communications manager 710, an I/O controller 715, a transceiver 720, an antenna 725, memory 730, and a processor 740. These components may be in electronic communication via one or more buses (e.g., bus 745).

The communications manager 710 may generate an SR for a set of data for an uplink transmission from a UE 115 to a base station 105 and determine whether the SR for the set of data is associated with a grant-free configuration for the UE 115. The communications manager 710 may generate transmit, to the base station 105, an indication of whether the SR is associated with the grant-free configuration based on the determination.

The I/O controller 715 may manage input and output signals for the device 705. The I/O controller 715 may also manage peripherals not integrated into the device 705. In some cases, the I/O controller 715 may represent a physical connection or port to an external peripheral. In some cases, the I/O controller 715 may utilize an operating system such as iOS®, ANDROID®, MS-DOS®, MS-WINDOWS®, OS/2®, UNIX®, LINUX®, or another known operating system. In other cases, the I/O controller 715 may represent or interact with a modem, a keyboard, a mouse, a touchscreen, or a similar device. In some cases, the I/O controller 715 may be implemented as part of a processor. In some cases, a user may interact with the device 705 via the I/O controller 715 or via hardware components controlled by the I/O controller 715.

The transceiver 720 may communicate bi-directionally, via one or more antennas, wired, or wireless links as described herein. For example, the transceiver 720 may represent a wireless transceiver and may communicate bi-directionally with another wireless transceiver. The transceiver 720 may also include a modem to modulate the packets and provide the modulated packets to the antennas for transmission, and to demodulate packets received from the antennas.

In some cases, the device 705 may include a single antenna 725 or, in some cases, the device 705 may have more than one antenna 725, which may be capable of concurrently transmitting or receiving multiple wireless transmissions.

The memory 730 may include random-access memory (RAM) and read-only memory (ROM). The memory 730 may store computer-readable, computer-executable code 735 including instructions that, when executed, cause the processor to perform various functions described herein. In some cases, the memory 730 may contain, among other things, a Basic I/O System (BIOS) which may control basic hardware or software operation such as the interaction with peripheral components or devices.

The processor 740 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In other cases, a memory controller may be integrated into the processor 740. The processor 740 may be configured to execute computer-readable instructions stored in a memory (e.g., the memory 730) to cause the device 705 to perform various functions (e.g., functions or tasks supporting scheduling requests for grant-free configurations).

The code 735 may include instructions to implement aspects of the present disclosure, including instructions to support wireless communications. The code 735 may be stored in a non-transitory computer-readable medium such as system memory or other type of memory. In some cases, the code 735 may not be directly executable by the processor 740 but may cause a computer (e.g., when compiled and executed) to perform functions described herein.

Figure 8:
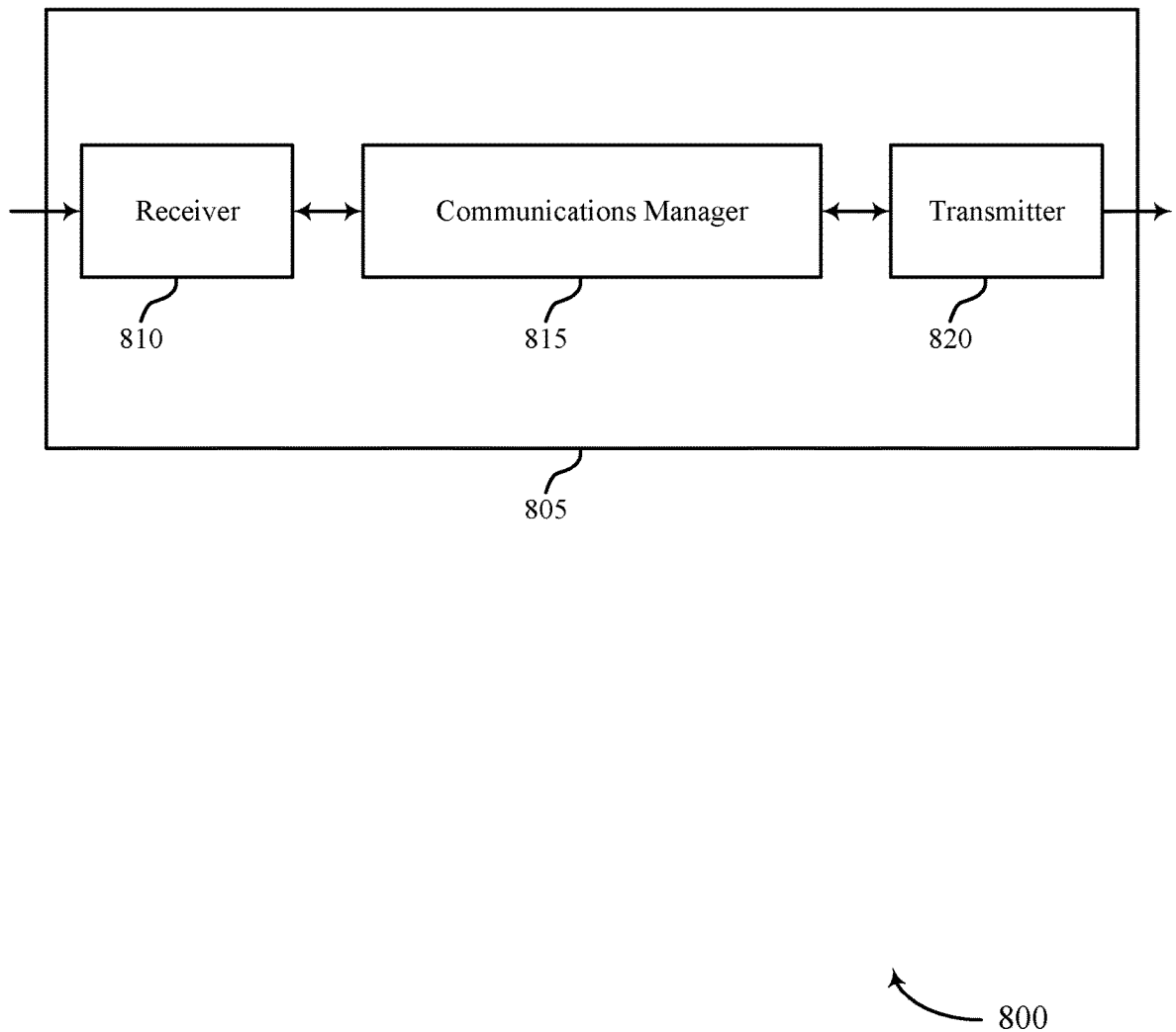
FIGS. 8 and 9 show block diagrams of devices in accordance with aspects of the present disclosure.

FIG. 8 shows a block diagram 800 of a device 805 in accordance with aspects of the present disclosure. The device 805 may be an example of aspects of a base station 105 as described herein. The device 805 may include a receiver 810, a communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to scheduling requests for grant-free configurations, etc.). Information may be passed on to other components of the device 805. The receiver 810 may be an example of aspects of the transceiver 1120 described with reference to FIG. 11. The receiver 810 may utilize a single antenna or a set of antennas.

The communications manager 815 may identify, by a base station, a set of grant-free configurations for a UE, receive, from the UE, an SR associated with an uplink transmission from the UE to the base station, where the SR indicates whether the SR is associated with a grant-free configuration of the set of grant-free configurations, and transmit a downlink transmission to the UE based on the SR, where the downlink transmission includes a feedback message, an uplink grant, or a combination thereof. The communications manager 815 may be an example of aspects of the communications manager 1110 described herein.

The communications manager 815, or its sub-components, may be implemented in hardware, code (e.g., software or firmware) executed by a processor, or any combination thereof. If implemented in code executed by a processor, the functions of the communications manager 815, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

Figure 9:
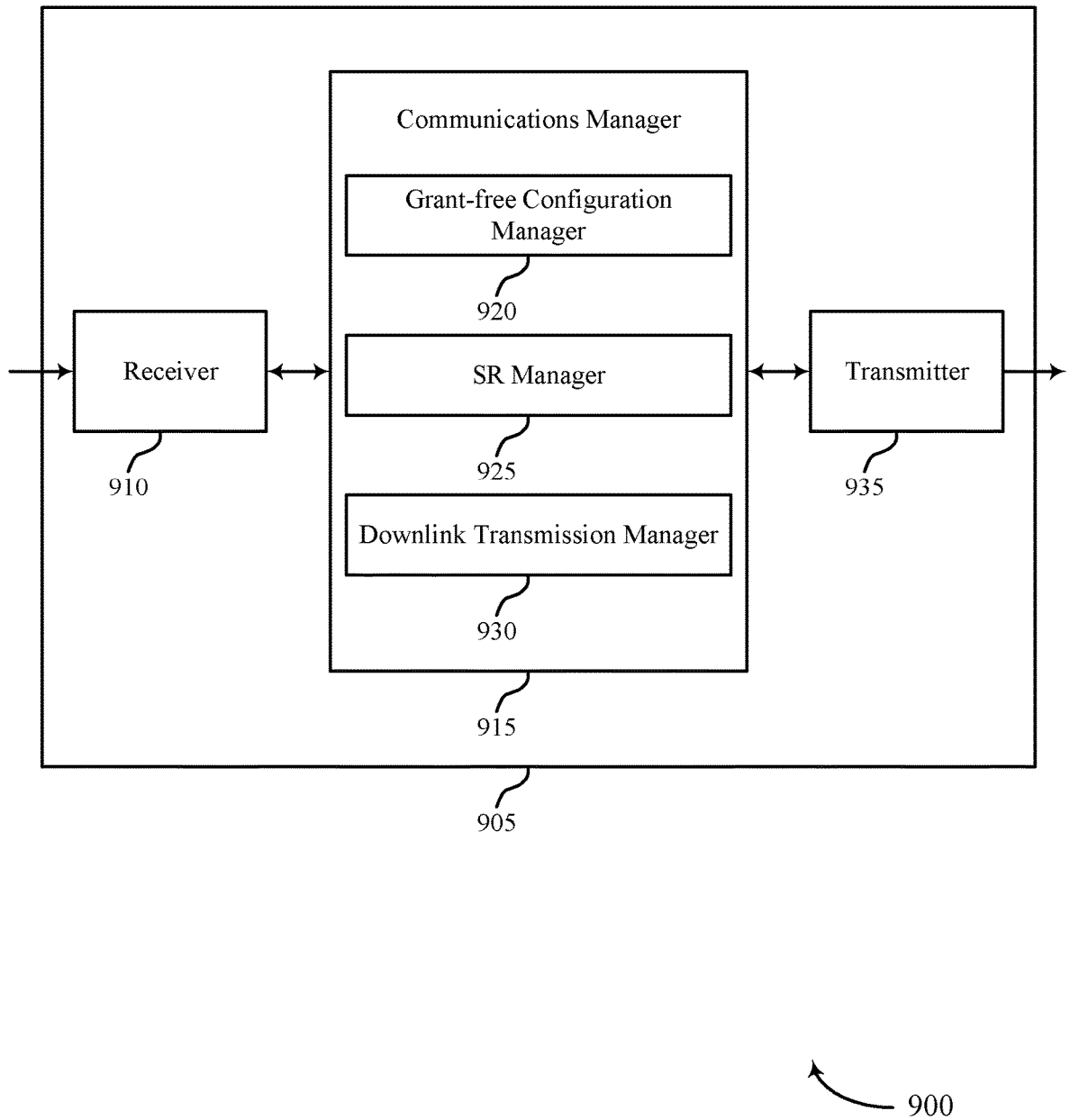

FIG. 9 shows a block diagram 900 of a device 905 in accordance with aspects of the present disclosure. The device 905 may be an example of aspects of a device 805 or a base station 105 as described herein. The device 905 may include a receiver 910, a communications manager 915, and a transmitter 935. The device 905 may also include a processor. Each of these components may be in communication with one another (e.g., via one or more buses).

The receiver 910 may receive information such as packets, user data, or control information associated with various information channels (e.g., control channels, data channels, and information related to scheduling requests for grant-free configurations, etc.). Information may be passed on to other components of the device 905. The receiver 910 may be an example of aspects of the transceiver 1120 described with reference to FIG. 11. The receiver 910 may utilize a single antenna or a set of antennas.

The communications manager 915 may be an example of aspects of the communications manager 815 as described herein. The communications manager 915 may include a grant-free configuration manager 920, an SR manager 925, and a downlink transmission manager 930. The communications manager 915 may be an example of aspects of the communications manager 1110 described herein.

The grant-free configuration manager 920 may identify, by a base station 105, a set of grant-free configurations for a UE.

The SR manager 925 may receive, from the UE 115, an SR associated with an uplink transmission from the UE 115 to the base station 105, where the SR indicates whether the SR is associated with a grant-free configuration of the set of grant-free configurations.

The downlink transmission manager 930 may transmit a downlink transmission to the UE 115 based on the SR, where the downlink transmission includes a feedback message, an uplink grant, or a combination thereof.

The transmitter 935 may transmit signals generated by other components of the device 905. In some examples, the transmitter 935 may be collocated with a receiver 910 in a transceiver module. For example, the transmitter 935 may be an example of aspects of the transceiver 1120 described with reference to FIG. 11. The transmitter 935 may utilize a single antenna or a set of antennas.

Figure 10:
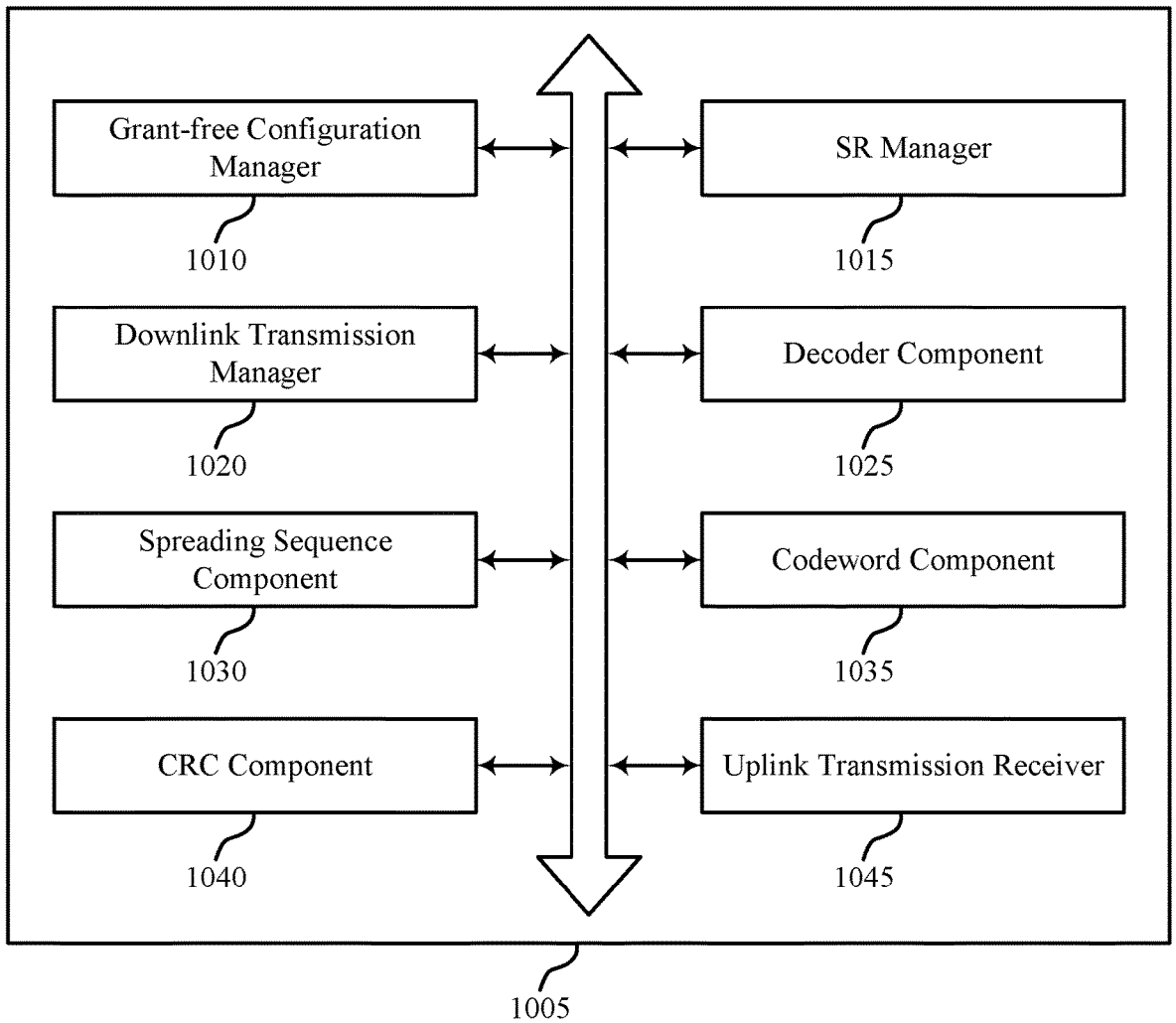
FIG. 10 shows a block diagram of a communications manager in accordance with aspects of the present disclosure.

FIG. 10 shows a block diagram 1000 of a communications manager 1005 in accordance with aspects of the present disclosure. The communications manager 1005 may be an example of aspects of a communications manager 815, a communications manager 915, or a communications manager 1110 described herein. The communications manager 1005 may include a grant-free configuration manager 1010, an SR manager 1015, a downlink transmission manager 1020, a decoder component 1025, a spreading sequence component 1030, a codeword component 1035, a CRC component 1040, and an uplink transmission receiver 1045. Each of these modules may communicate, directly or indirectly, with one another (e.g., via one or more buses).

The grant-free configuration manager 1010 may identify, by a base station, a set of grant-free configurations for a UE 115. In some examples, the grant-free configuration manager 1010 may determine that the SR is associated with the grant-free configuration. Alternatively, the grant-free configuration manager 1010 may determine that the SR is not associated with the grant-free configuration.

The SR manager 1015 may receive, from the UE 115, an SR associated with an uplink transmission from the UE to the base station, where the SR indicates whether the SR is associated with a grant-free configuration of the set of grant-free configurations. In some examples, the SR manager 1015 may transmit, to the UE 115, an RRC message or a MAC CE that indicates information to convey via the SR.

In some cases, the SR indicates a RAT, a carrier, an index of the grant-free configuration, or a combination.

The downlink transmission manager 1020 may transmit a downlink transmission to the UE 115 based on the SR, where the downlink transmission includes a feedback message, an uplink grant, or a combination thereof. In some examples, the downlink transmission manager 1020 may transmit the feedback message or the uplink grant based on determining that the SR is not associated with the grant-free configuration.

The decoder component 1025 may decode a transmission from the UE transmitted over a set of time-frequency resources associated with the grant-free configuration.

The spreading sequence component 1030 may identify a spreading sequence associated with the SR, where the spreading sequence indicates information associated with the grant-free configuration.

The codeword component 1035 may identify a codeword of the SR, where the codeword indicates information associated with the grant-free configuration.

The CRC component 1040 may determine a CRC mask of the SR, where the CRC mask corresponds to information associated with the grant-free configuration.

The uplink transmission receiver 1045 may receive the uplink transmission from the UE based on the SR. In some cases, the uplink transmission and the SR are received on different carriers. In some cases, the uplink transmission and the SR are received using different RATs.

Figure 11:
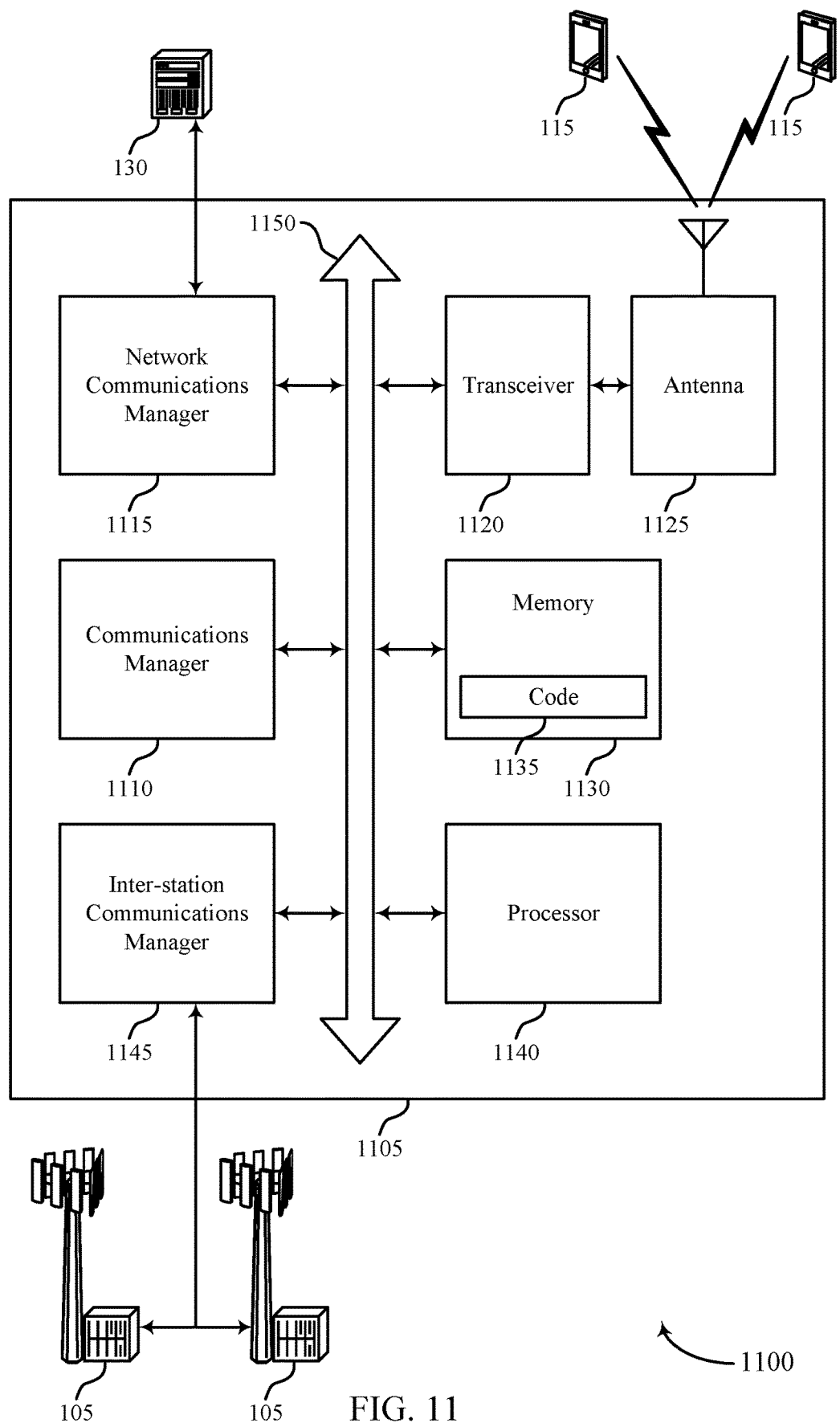
FIG. 11 shows a diagram of a system including a device in accordance with aspects of the present disclosure.

FIG. 11 shows a diagram of a system 1100 including a device 1105 in accordance with aspects of the present disclosure. The device 1105 may be an example of or include the components of device 805, device 905, or a base station 105 as described herein. The device 1105 may include components for bi-directional voice and data communications including components for transmitting and receiving communications, including a communications manager 1110, a network communications manager 1115, a transceiver 1120, an antenna 1125, memory 1130, a processor 1140, and an inter-station communications manager 1145. These components may be in electronic communication via one or more buses (e.g., bus 1150).

The communications manager 1110 may identify, by a base station 105, a set of grant-free configurations for a UE 115. The communications manager 1110 may receive, from the UE 115, an SR associated with an uplink transmission from the UE 115 to the base station 105, where the SR indicates whether the SR is associated with a grant-free configuration of the set of grant-free configurations. The communications manager 1110 may transmit a downlink transmission to the UE 115 based on the SR, where the downlink transmission may include a feedback message, an uplink grant, or a combination thereof.

The network communications manager 1115 may manage communications with the core network (e.g., via one or more wired backhaul links). For example, the network communications manager 1115 may manage the transfer of data communications for client devices, such as one or more UEs 115.

The transceiver 1120 may communicate bi-directionally, via one or more antennas, wired, or wireless links as described above. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the device 1105 may include a single antenna 1125, or, in some cases, the device 1105 may have more than one antenna 1125, which may be capable of concurrently transmitting or receiving multiple wireless transmissions.

The memory 1130 may include RAM, ROM, or a combination thereof. The memory 1130 may store computer-readable code 1135 including instructions that, when executed by a processor (e.g., the processor 1140) cause the device to perform various functions described herein. In some cases, the memory 1130 may contain, among other things, a BIOS which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some cases, a memory controller may be integrated into processor 1140. The processor 1140 may be configured to execute computer-readable instructions stored in a memory (e.g., the memory 1130) to cause the device #{device} to perform various functions (e.g., functions or tasks supporting scheduling requests for grant-free configurations).

The inter-station communications manager 1145 may manage communications with other base station 105, and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communications network technology to provide communication between base stations 105.

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
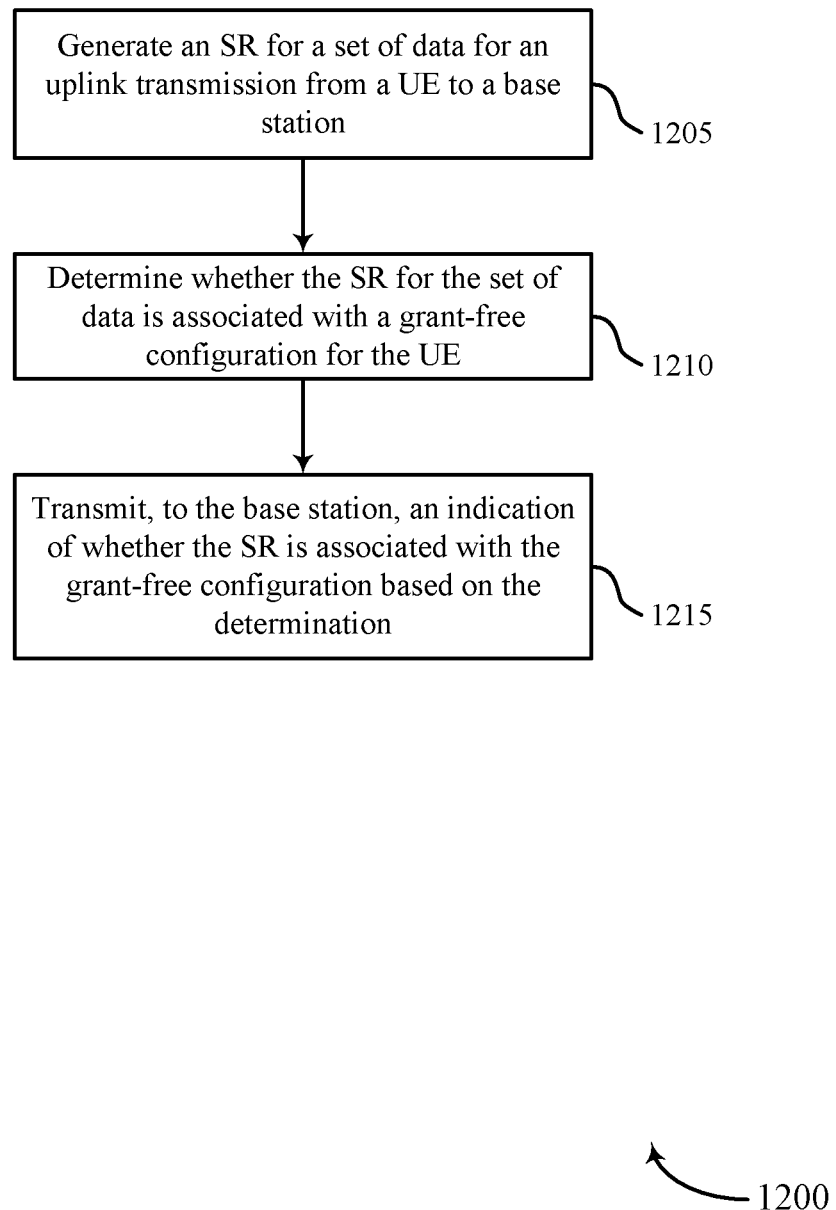
FIGS. 12 through 19 show flowcharts illustrating methods in accordance with aspects of the present disclosure.

FIG. 12 shows a flowchart illustrating a method 1200 in accordance with aspects of the present disclosure. The operations of method 1200 may be implemented by a UE 115 or its components as described herein. For example, the operations of method 1200 may be performed by a communications manager as described with reference to FIGS. 4 through 7. In some examples, a UE 115 may execute a set of instructions to control the functional elements of the UE to perform the functions described below. Additionally or alternatively, a UE 115 may perform aspects of the functions described below using special-purpose hardware.

At 1205, a UE 115 may generate an SR for a set of data for an uplink transmission from the UE 115 to a base station 105. The operations of 1205 may be performed according to the methods described herein. In some examples, aspects of the operations of 1205 may be performed by an SR manager as described with reference to FIGS. 4 through 7.

At 1210, the UE 115 may determine whether the SR for the set of data is associated with a grant-free configuration for the UE 115. The operations of 1210 may be performed according to the methods described herein. In some examples, aspects of the operations of 1210 may be performed by a grant-free configuration manager as described with reference to FIGS. 4 through 7.

At 1215, the UE 115 may transmit, to the base station 105, an indication of whether the SR is associated with the grant-free configuration based on the determination. The operations of 1215 may be performed according to the methods described herein. In some examples, aspects of the operations of 1215 may be performed by a grant-free configuration manager as described with reference to FIGS. 4 through 7.

Figure 13:
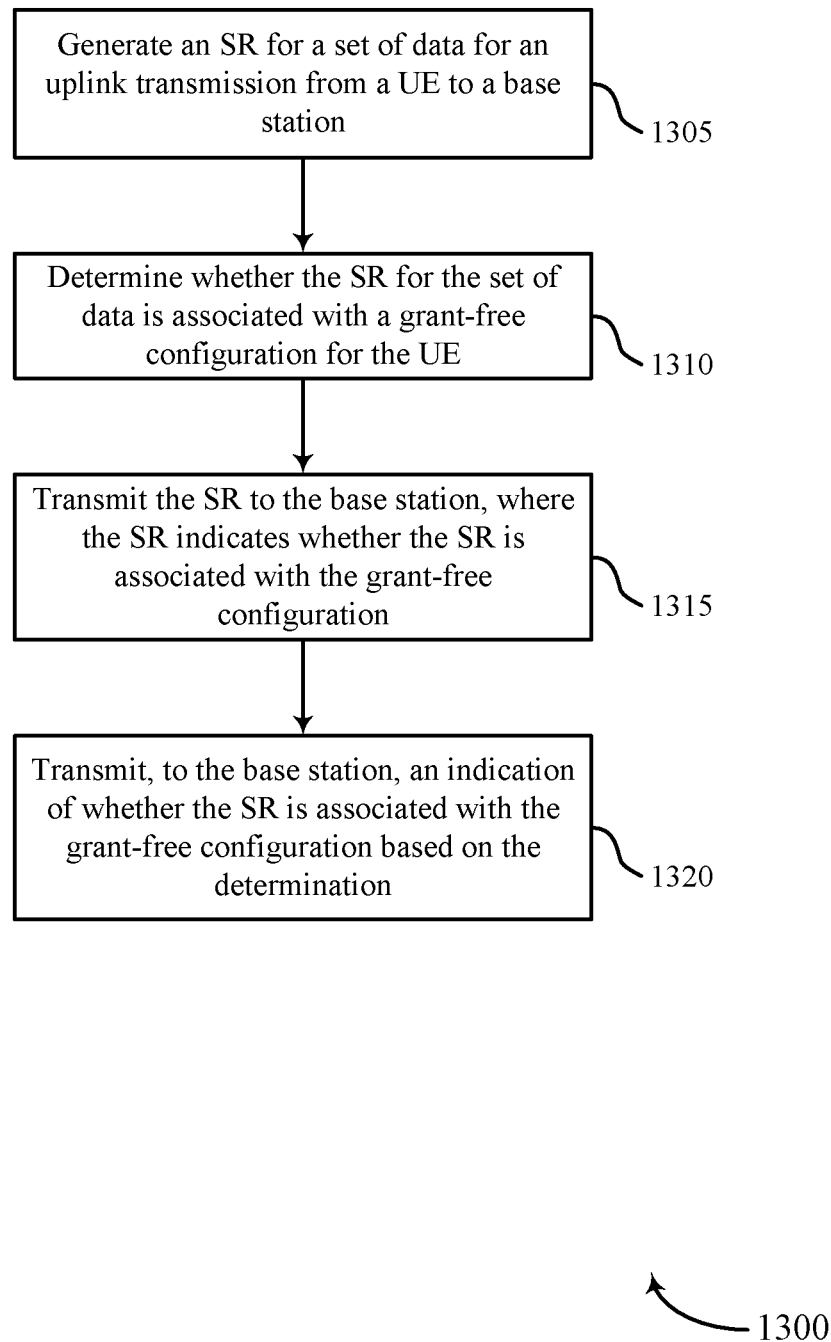

FIG. 13 shows a flowchart illustrating a method 1300 in accordance with aspects of the present disclosure. The operations of method 1300 may be implemented by a UE 115 or its components as described herein. For example, the operations of method 1300 may be performed by a communications manager as described with reference to FIGS. 4 through 7. In some examples, a UE 115 may execute a set of instructions to control the functional elements of the UE to perform the functions described below. Additionally or alternatively, a UE 115 may perform aspects of the functions described below using special-purpose hardware.

At 1305, a UE 115 may generate an SR for a set of data for an uplink transmission from the UE 115 to a base station 105. The operations of 1305 may be performed according to the methods described herein. In some examples, aspects of the operations of 1305 may be performed by an SR manager as described with reference to FIGS. 4 through 7.

At 1310, the UE 115 may determine whether the SR for the set of data is associated with a grant-free configuration for the UE 115. The operations of 1310 may be performed according to the methods described herein. In some examples, aspects of the operations of 1310 may be performed by a grant-free configuration manager as described with reference to FIGS. 4 through 7.

At 1315, the UE 115 may transmit the SR to the base station 105, where the SR indicates whether the SR is associated with the grant-free configuration. The operations of 1315 may be performed according to the methods described herein. In some examples, aspects of the operations of 1315 may be performed by an SR manager as described with reference to FIGS. 4 through 7.

At 1320, the UE 115 may transmit, to the base station 105, an indication of whether the SR is associated with the grant-free configuration based on the determination. The operations of 1320 may be performed according to the methods described herein. In some examples, aspects of the operations of 1320 may be performed by a grant-free configuration manager as described with reference to FIGS. 4 through 7.

Figure 14:
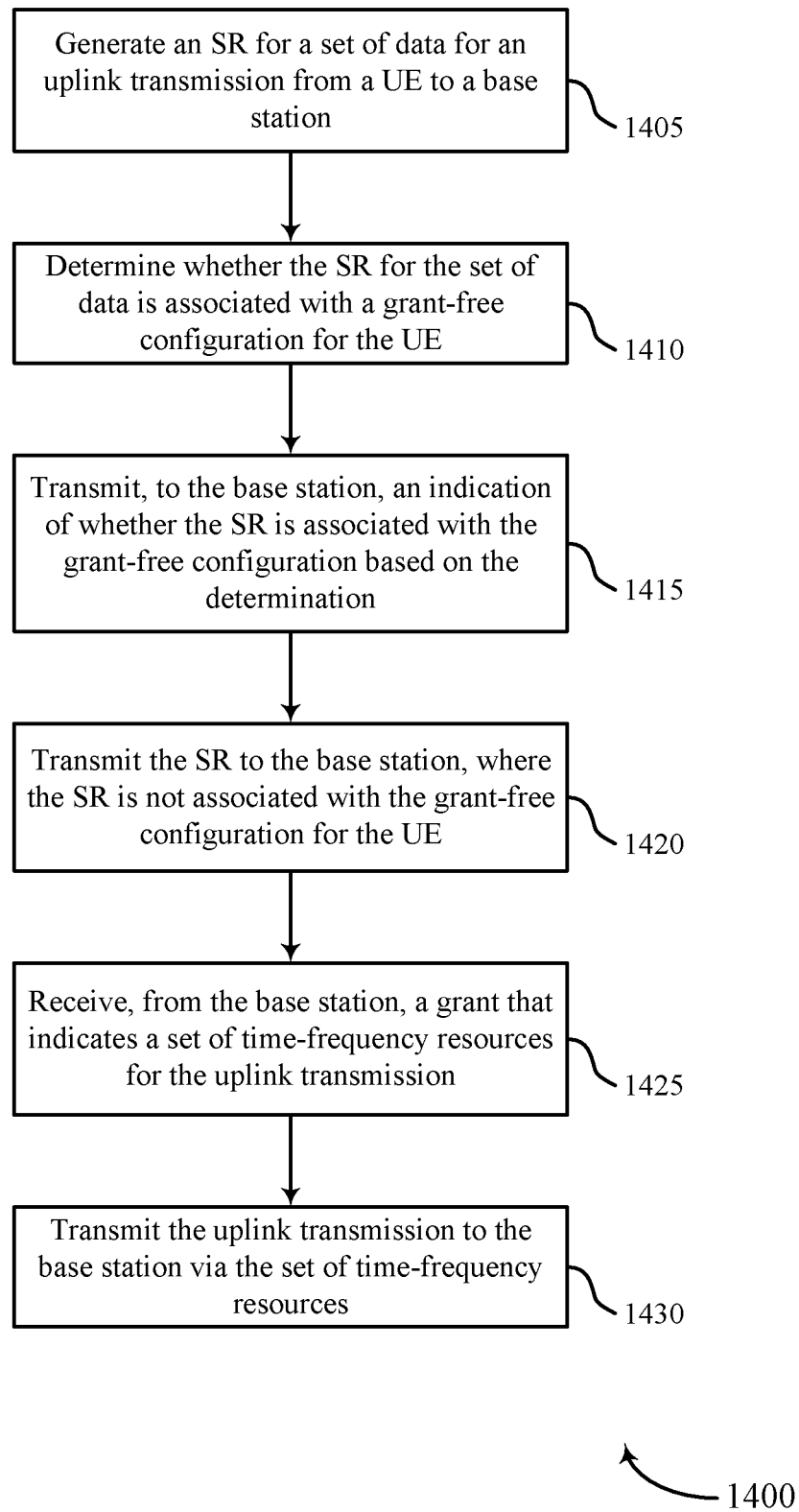

FIG. 14 shows a flowchart illustrating a method 1400 in accordance with aspects of the present disclosure. The operations of method 1400 may be implemented by a UE 115 or its components as described herein. For example, the operations of method 1400 may be performed by a communications manager as described with reference to FIGS. 4 through 7. In some examples, a UE 115 may execute a set of instructions to control the functional elements of the UE 115 to perform the functions described below. Additionally or alternatively, a UE 115 may perform aspects of the functions described below using special-purpose hardware.

At 1405, a UE 115 may generate an SR for a set of data for an uplink transmission from the UE 115 to a base station 105. The operations of 1405 may be performed according to the methods described herein. In some examples, aspects of the operations of 1405 may be performed by an SR manager as described with reference to FIGS. 4 through 7.

At 1410, the UE 115 may determine whether the SR for the set of data is associated with a grant-free configuration for the UE 115. The operations of 1410 may be performed according to the methods described herein. In some examples, aspects of the operations of 1410 may be performed by a grant-free configuration manager as described with reference to FIGS. 4 through 7.

At 1415, the UE 115 may transmit, to the base station 105, an indication of whether the SR is associated with the grant-free configuration based on the determination. The operations of 1415 may be performed according to the methods described herein. In some examples, aspects of the operations of 1415 may be performed by a grant-free configuration manager as described with reference to FIGS. 4 through 7.

At 1420, the UE 115 may transmit the SR to the base station 105, where the SR is not associated with the grant-free configuration for the UE 115. The operations of 1420 may be performed according to the methods described herein. In some examples, aspects of the operations of 1420 may be performed by an SR manager as described with reference to FIGS. 4 through 7.

At 1425, the UE 115 may receive, from the base station, a grant that indicates a set of time-frequency resources for the uplink transmission. The operations of 1425 may be performed according to the methods described herein. In some examples, aspects of the operations of 1425 may be performed by an uplink transmission manager as described with reference to FIGS. 4 through 7.

At 1430, the UE 115 may transmit the uplink transmission to the base station 105 via the set of time-frequency resources. The operations of 1430 may be performed according to the methods described herein. In some examples, aspects of the operations of 1430 may be performed by an uplink transmission manager as described with reference to FIGS. 4 through 7.

Figure 15:
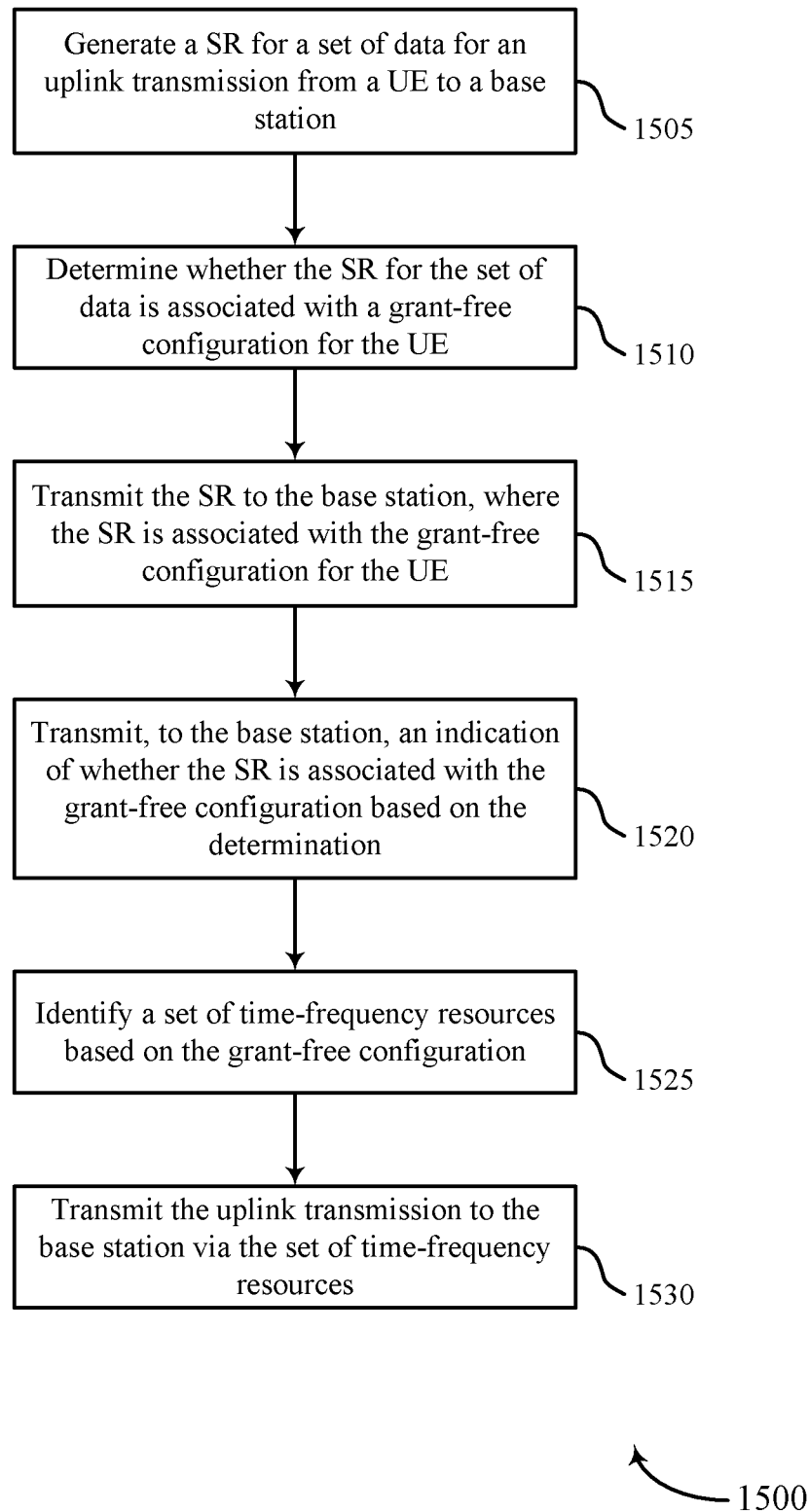

FIG. 15 shows a flowchart illustrating a method 1500 in accordance with aspects of the present disclosure. The operations of method 1500 may be implemented by a UE 115 or its components as described herein. For example, the operations of method 1500 may be performed by a communications manager as described with reference to FIGS. 4 through 7. In some examples, a UE 115 may execute a set of instructions to control the functional elements of the UE to perform the functions described below. Additionally or alternatively, a UE 115 may perform aspects of the functions described below using special-purpose hardware.

At 1505, a UE 115 may generate an SR for a set of data for an uplink transmission from the UE 115 to a base station 105. The operations of 1505 may be performed according to the methods described herein. In some examples, aspects of the operations of 1505 may be performed by an SR manager as described with reference to FIGS. 4 through 7.

At 1510, the UE 115 may determine whether the SR for the set of data is associated with a grant-free configuration for the UE 115. The operations of 1510 may be performed according to the methods described herein. In some examples, aspects of the operations of 1510 may be performed by a grant-free configuration manager as described with reference to FIGS. 4 through 7.

At 1515, the UE 115 may transmit the SR to the base station 105, where the SR may be associated with the grant-free configuration for the UE 115. The operations of 1515 may be performed according to the methods described herein. In some examples, aspects of the operations of 1515 may be performed by an SR manager as described with reference to FIGS. 4 through 7.

At 1520, the UE 115 may transmit, to the base station 105, an indication of whether the SR is associated with the grant-free configuration based on the determination. The operations of 1520 may be performed according to the methods described herein. In some examples, aspects of the operations of 1520 may be performed by a grant-free configuration manager as described with reference to FIGS. 4 through 7.

At 1525, the UE 115 may identify a set of time-frequency resources based on the grant-free configuration. The operations of 1525 may be performed according to the methods described herein. In some examples, aspects of the operations of 1525 may be performed by a grant-free configuration manager as described with reference to FIGS. 4 through 7.

At 1530, the UE 115 may transmit the uplink transmission to the base station via the set of time-frequency resources. The operations of 1530 may be performed according to the methods described herein. In some examples, aspects of the operations of 1530 may be performed by an uplink transmission manager as described with reference to FIGS. 4 through 7.

Figure 16:
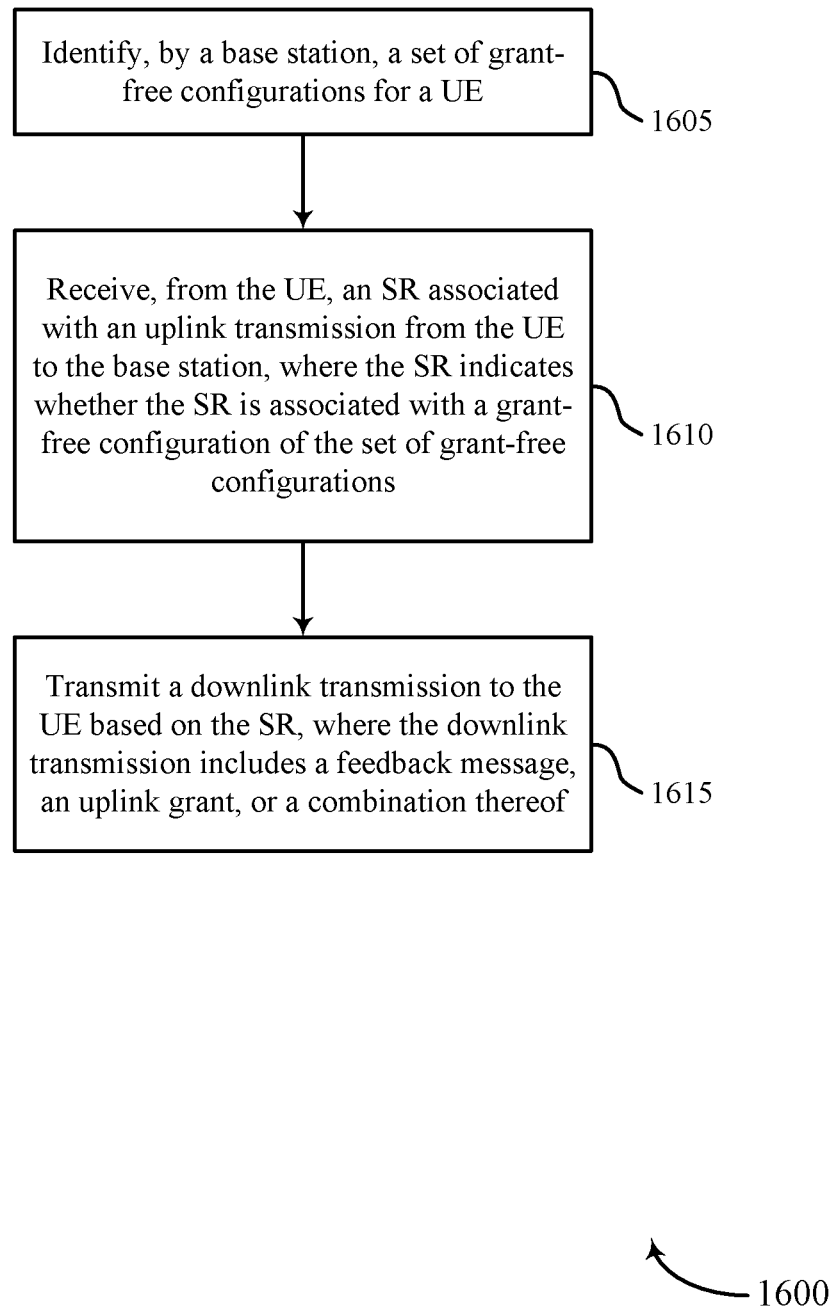

FIG. 16 shows a flowchart illustrating a method 1600 in accordance with aspects of the present disclosure. The operations of method 1600 may be implemented by a base station 105 or its components as described herein. For example, the operations of method 1600 may be performed by a communications manager as described with reference to FIGS. 8 through 11. In some examples, a base station 105 may execute a set of instructions to control the functional elements of the base station 105 to perform the functions described below. Additionally or alternatively, a base station 105 may perform aspects of the functions described below using special-purpose hardware.

At 1605, a base station may identify a set of grant-free configurations for a UE 115. The operations of 1605 may be performed according to the methods described herein. In some examples, aspects of the operations of 1605 may be performed by a grant-free configuration manager as described with reference to FIGS. 8 through 11.

At 1610, the base station 105 may receive, from the UE 115, an SR associated with an uplink transmission from the UE 115 to the base station 105, where the SR indicates whether the SR is associated with a grant-free configuration of the set of grant-free configurations. The operations of 1610 may be performed according to the methods described herein. In some examples, aspects of the operations of 1610 may be performed by an SR manager as described with reference to FIGS. 8 through 11.

At 1615, the base station 105 may transmit a downlink transmission to the UE 115 based on the SR, where the downlink transmission may include a feedback message, an uplink grant, or a combination thereof. The operations of 1615 may be performed according to the methods described herein. In some examples, aspects of the operations of 1615 may be performed by a downlink transmission manager as described with reference to FIGS. 8 through 11.

Figure 17:
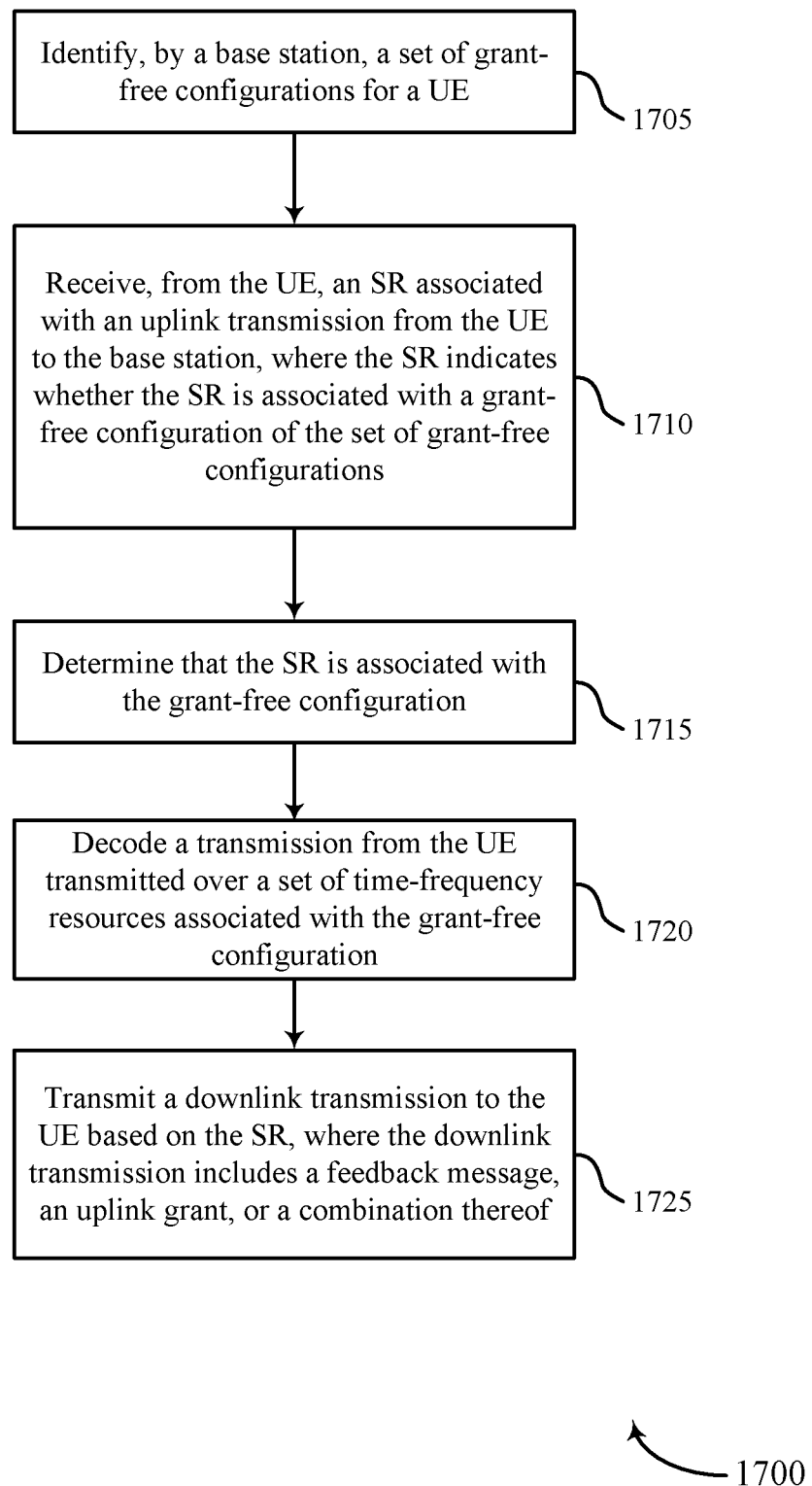

FIG. 17 shows a flowchart illustrating a method 1700 in accordance with aspects of the present disclosure. The operations of method 1700 may be implemented by a base station 105 or its components as described herein. For example, the operations of method 1700 may be performed by a communications manager as described with reference to FIGS. 8 through 11. In some examples, a base station 105 may execute a set of instructions to control the functional elements of the base station to perform the functions described below. Additionally or alternatively, a base station 105 may perform aspects of the functions described below using special-purpose hardware.

At 1705, a base station 105 may identify a set of grant-free configurations for a UE 115. The operations of 1705 may be performed according to the methods described herein. In some examples, aspects of the operations of 1705 may be performed by a grant-free configuration manager as described with reference to FIGS. 8 through 11.

At 1710, the base station 105 may receive, from the UE, an SR associated with an uplink transmission from the UE 115 to the base station 105, where the SR indicates whether the SR is associated with a grant-free configuration of the set of grant-free configurations. The operations of 1710 may be performed according to the methods described herein. In some examples, aspects of the operations of 1710 may be performed by an SR manager as described with reference to FIGS. 8 through 11.

At 1715, the base station 105 may determine that the SR is associated with the grant-free configuration. The operations of 1715 may be performed according to the methods described herein. In some examples, aspects of the operations of 1715 may be performed by a grant-free configuration manager as described with reference to FIGS. 8 through 11.

At 1720, the base station 105 may decode a transmission from the UE transmitted over a set of time-frequency resources associated with the grant-free configuration. The operations of 1720 may be performed according to the methods described herein. In some examples, aspects of the operations of 1720 may be performed by a decoder component as described with reference to FIGS. 8 through 11.

At 1725, the base station 105 may transmit a downlink transmission to the UE 115 based on the SR, where the downlink transmission may include a feedback message, an uplink grant, or a combination thereof. The operations of 1725 may be performed according to the methods described herein. In some examples, aspects of the operations of 1725 may be performed by a downlink transmission manager as described with reference to FIGS. 8 through 11.

Figure 18:
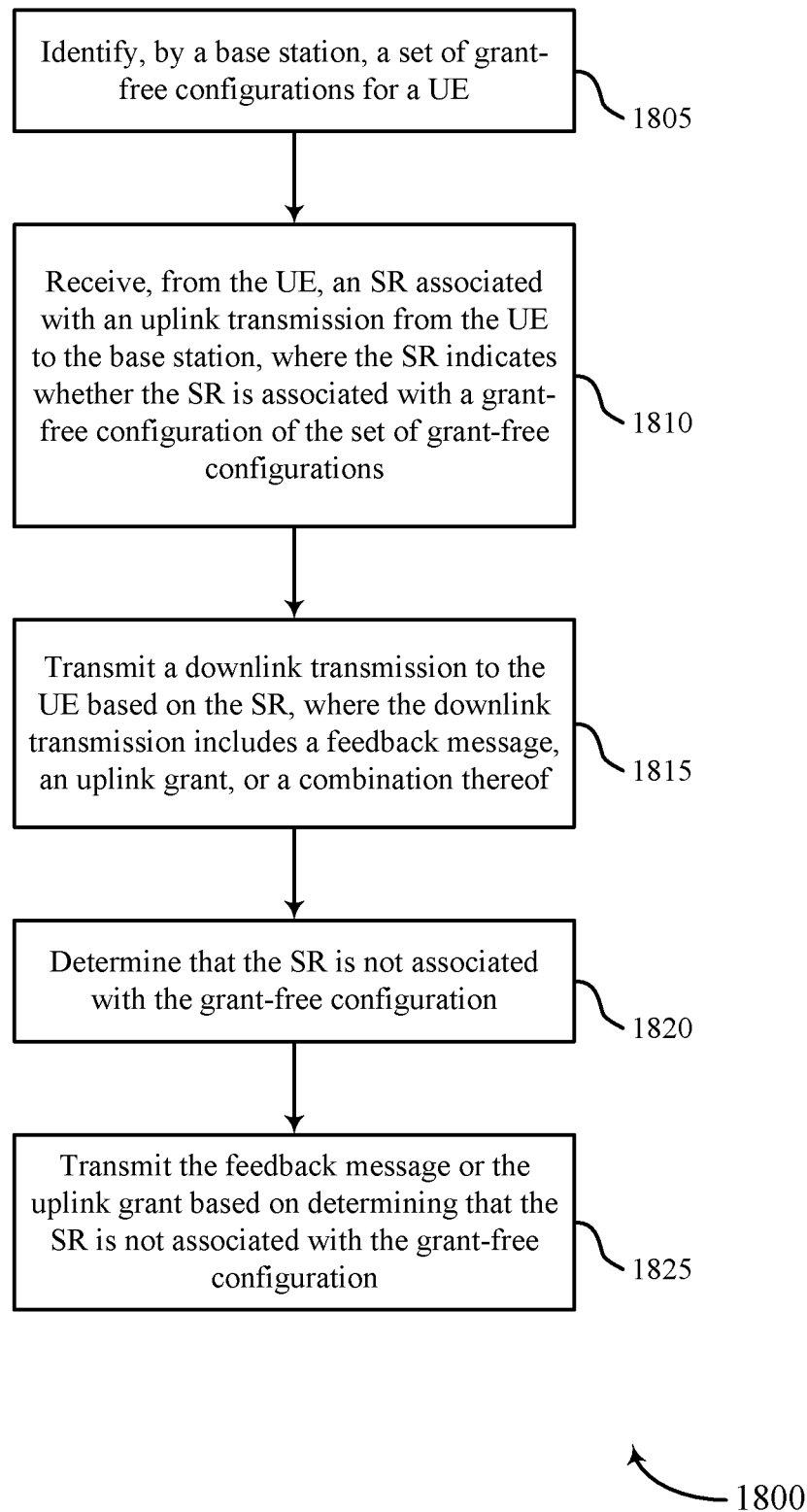

FIG. 18 shows a flowchart illustrating a method 1800 in accordance with aspects of the present disclosure. The operations of method 1800 may be implemented by a base station 105 or its components as described herein. For example, the operations of method 1800 may be performed by a communications manager as described with reference to FIGS. 8 through 11. In some examples, a base station 105 may execute a set of instructions to control the functional elements of the base station 105 to perform the functions described below. Additionally or alternatively, a base station 105 may perform aspects of the functions described below using special-purpose hardware.

At 1805, the base station 105 may identify a set of grant-free configurations for a UE 115. The operations of 1805 may be performed according to the methods described herein. In some examples, aspects of the operations of 1805 may be performed by a grant-free configuration manager as described with reference to FIGS. 8 through 11.

At 1810, the base station 105 may receive, from the UE 115, an SR associated with an uplink transmission from the UE 115 to the base station 105, where the SR indicates whether the SR is associated with a grant-free configuration of the set of grant-free configurations. The operations of 1810 may be performed according to the methods described herein. In some examples, aspects of the operations of 1810 may be performed by an SR manager as described with reference to FIGS. 8 through 11.

At 1815, the base station 105 may transmit a downlink transmission to the UE 115 based on the SR, where the downlink transmission may include a feedback message, an uplink grant, or a combination thereof. The operations of 1815 may be performed according to the methods described herein. In some examples, aspects of the operations of 1815 may be performed by a downlink transmission manager as described with reference to FIGS. 8 through 11.

At 1820, the base station 105 may determine that the SR is not associated with the grant-free configuration. The operations of 1820 may be performed according to the methods described herein. In some examples, aspects of the operations of 1820 may be performed by a grant-free configuration manager as described with reference to FIGS. 8 through 11.

At 1825, the base station 105 may transmit the feedback message or the uplink grant based on determining that the SR is not associated with the grant-free configuration. The operations of 1825 may be performed according to the methods described herein. In some examples, aspects of the operations of 1825 may be performed by a downlink transmission manager as described with reference to FIGS. 8 through 11.

Figure 19:
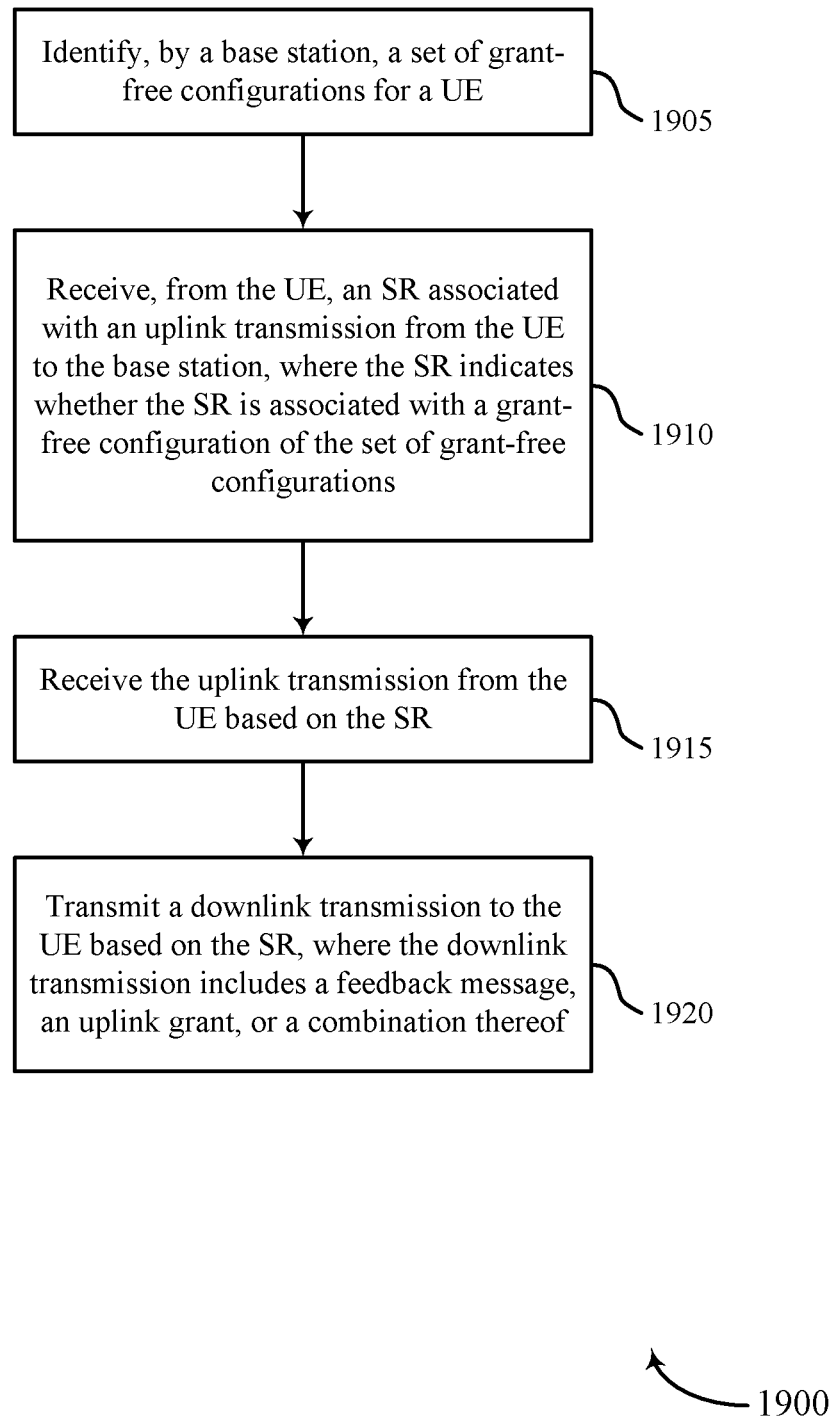

FIG. 19 shows a flowchart illustrating a method 1900 in accordance with aspects of the present disclosure. The operations of method 1900 may be implemented by a base station 105 or its components as described herein. For example, the operations of method 1900 may be performed by a communications manager as described with reference to FIGS. 8 through 11. In some examples, a base station 105 may execute a set of instructions to control the functional elements of the base station 105 to perform the functions described below. Additionally or alternatively, a base station 105 may perform aspects of the functions described below using special-purpose hardware.

At 1905, the base station 105 may identify a set of grant-free configurations for a UE 115. The operations of 1905 may be performed according to the methods described herein. In some examples, aspects of the operations of 1905 may be performed by a grant-free configuration manager as described with reference to FIGS. 8 through 11.

At 1910, the base station 105 may receive, from the UE 115, an SR associated with an uplink transmission from the UE 115 to the base station 105, where the SR indicates whether the SR is associated with a grant-free configuration of the set of grant-free configurations. The operations of 1910 may be performed according to the methods described herein. In some examples, aspects of the operations of 1910 may be performed by an SR manager as described with reference to FIGS. 8 through 11.

At 1915, the base station 105 may receive the uplink transmission from the UE 115 based on the SR. The operations of 1915 may be performed according to the methods described herein. In some examples, aspects of the operations of 1915 may be performed by an uplink transmission receiver as described with reference to FIGS. 8 through 11.

At 1920, the base station 105 may transmit a downlink transmission to the UE 115 based on the SR, where the downlink transmission may include a feedback message, an uplink grant, or a combination thereof. The operations of 1920 may be performed according to the methods described herein. In some examples, aspects of the operations of 1920 may be performed by a downlink transmission manager as described with reference to FIGS. 8 through 11.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code-division multiple access (CDMA), time-division multiple access (TDMA), frequency-division multiple access (FDMA), orthogonal frequency-division multiple access (OFDMA), single carrier frequency-division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), E-UTRA, Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems 100 and 200, or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications, comprising:
   receiving, from a base station, signaling that configures a user equipment (UE) with a set of grant-free configurations, wherein each grant-free configuration of the set of grant-free configurations indicates a respective set of resources for grant-free transmissions and is associated with a respective grant-free index, each respective grant-free index indicating a respective grant-free configuration of the set of grant-free configurations;
   selecting, by the UE, one or more grant-free configurations from the set of grant-free configurations based at least in part on the received signaling;
   generating a scheduling request (SR) for a set of data for an uplink transmission from the UE to the base station based at least in part on the selected one or more grant-free configurations; and
   transmitting, to the base station, the SR, the SR associated with a grant-free configuration of the selected one or more grant-free configurations, wherein the SR comprises the respective grant-free index that indicates the grant-free configuration, the grant-free configuration indicating the respective set of resources for the uplink transmission.

2. The method of claim 1, further comprising:
identifying a spreading sequence that indicates information associated with the grant-free configuration, wherein the SR is transmitted according to the spreading sequence.

3. The method of claim 1, further comprising:
identifying a codeword that indicates information associated with the grant-free configuration, wherein the SR comprises the codeword.

4. The method of claim 1, further comprising:
identifying a cyclic redundancy check (CRC) mask corresponding to information associated with the grant-free configuration, wherein the SR is transmitted based at least in part on the CRC mask.

5. The method of claim 1, wherein the SR further comprises an indication of a radio-access technology (RAT), a carrier, or both.

6. The method of claim 1, further comprising:
identifying the respective set of resources based at least in part on the grant-free configuration; and
transmitting the uplink transmission to the base station via the respective set of resources.

7. The method of claim 6, wherein the uplink transmission and the SR are transmitted on different carriers.

8. The method of claim 6, wherein the uplink transmission and the SR are transmitted using different radio-access technologies (RATs).

9. A method for wireless communications, comprising:
identifying, by a base station, a set of grant-free configurations for a user equipment (UE);
transmitting, to the UE, signaling that configures the UE with the set of grant-free configurations, wherein each grant-free configuration of the set of grant-free configurations indicates a respective set of resources for grant-free transmissions and is associated with a respective grant-free index, each respective grant-free index indicating a respective grant-free configuration of the set of grant-free configurations;
receiving, from the UE, a scheduling request (SR) associated with an uplink transmission from the UE to the base station, the SR associated with a grant-free configuration of one or more grant-free configurations of the set of grant-free configurations, wherein the SR comprises the respective grant-free index that indicates the grant-free configuration, the grant-free configuration indicating the respective set of resources for the uplink transmission; and
transmitting a downlink transmission to the UE based at least in part on the SR, wherein the downlink transmission comprises a feedback message, an uplink grant, or a combination thereof.

10. The method of claim 9, further comprising:
determining that the SR is associated with the grant-free configuration; and
decoding a transmission from the UE transmitted over the respective set of resources indicated by the grant-free configuration.

11. The method of claim 10, further comprising:
identifying a spreading sequence associated with the SR, wherein the spreading sequence indicates information associated with the grant-free configuration.

12. The method of claim 10, further comprising:
identifying a codeword of the SR, wherein the codeword indicates information associated with the grant-free configuration.

13. The method of claim 10, further comprising:
determining a cyclic redundancy check (CRC) mask of the SR, wherein the CRC mask corresponds to information associated with the grant-free configuration.

14. The method of claim 10, wherein the SR further comprises an indication of a radio-access technology (RAT), a carrier, or both.

15. The method of claim 9, further comprising:
transmitting, to the UE, a radio resource control (RRC) message or a media access control (MAC) control element (CE) that indicates information to convey via the SR.

16. The method of claim 9, further comprising:
receiving the uplink transmission from the UE based at least in part on the SR.

17. The method of claim 16, wherein the uplink transmission and the SR are received on different carriers.

18. The method of claim 16, wherein the uplink transmission and the SR are received using different radio-access technologies (RATs).

19. An apparatus for wireless communications, comprising:
a processor,
memory coupled with the processor; and
instructions stored in the memory and executable by the processor to cause the apparatus to:
receive, from a base station, signaling that configures a user equipment (UE) with a set of grant-free configurations, wherein each grant-free configuration of the set of grant-free configurations indicates a respective set of resources for grant-free transmissions and is associated with a respective grant-free index, each respective grant-free index indicating a respective grant-free configuration of the set of grant-free configurations;
select, by the UE, one or more grant-free configurations from the set of grant-free configurations based at least in part on the received signaling;
generate a scheduling request (SR) for a set of data for an uplink transmission from the UE to the base station based at least in part on the selected one or more grant-free configurations; and
transmit, to the base station, the SR, the SR associated with the grant-free configuration of the selected one or more grant-free configurations, wherein the SR comprises the respective grant-free index that indicates the grant-free configuration, the grant-free configuration indicating the respective set of resources for the uplink transmission.

20. The apparatus of claim 19, wherein the instructions are further executable by the processor to cause the apparatus to:
identify a spreading sequence that indicates information associated with the grant-free configuration, wherein the SR is transmitted according to the spreading sequence.

21. The apparatus of claim 19, wherein the instructions are further executable by the processor to cause the apparatus to:
identify a codeword that indicates information associated with the grant-free configuration, wherein the SR comprises the codeword.

22. An apparatus for wireless communications, comprising:
  a processor,
  memory coupled with the processor; and
  instructions stored in the memory and executable by the processor to cause the apparatus to:
    identify, by a base station, a set of grant-free configurations for a user equipment (UE);
    transmit, to the UE, signaling that configures the UE with the set of grant-free configurations, wherein each grant-free configuration of the set of grant-free configurations indicates a respective set of resources for grant-free transmissions and is associated with a respective grant-free index, each grant-free index indicating a respective grant-free configuration of the set of grant-free configurations;
    receive, from the UE, a scheduling request (SR) associated with an uplink transmission from the UE to the base station, the SR associated with a grant-free configuration of one or more grant-free configurations selected by the UE from the set of grant-free configurations, wherein the SR comprises the respective grant-free index that indicates the grant-free configuration, the grant-free configuration indicating the respective set of resources for the uplink transmission; and
    transmit a downlink transmission to the UE based at least in part on the SR, wherein the downlink transmission comprises a feedback message, an uplink grant, or a combination thereof.

23. The apparatus of claim 22, wherein the instructions are further executable by the processor to cause the apparatus to:
  determine that the SR is associated with the grant-free configuration; and
  decode a transmission from the UE transmitted over the respective set of resources indicated by the grant-free configuration.

24. The apparatus of claim 23, wherein the instructions are further executable by the processor to cause the apparatus to:
  identify a spreading sequence associated with the SR, wherein the spreading sequence indicates information associated with the grant-free configuration.

25. The apparatus of claim 23, wherein the instructions are further executable by the processor to cause the apparatus to:
  identify a codeword of the SR, wherein the codeword indicates information associated with the grant-free configuration.

* * * * *